(12) United States Patent
Marini et al.

(10) Patent No.: US 10,800,371 B2
(45) Date of Patent: Oct. 13, 2020

(54) FASTENER FOR DETACHABLY CONNECTING A PANEL TO A STRUCTURE, COVER PANEL FOR AN AIRBAG AND VEHICLE COMPRISING A STRUCTURE AND AN AIRBAG

(71) Applicant: A. Raymond et Cie, Grenoble (FR)

(72) Inventors: Alexander Marini, Rheinfelden (DE); Andy Junge, Kandern (DE); Axel Rhein, Steinen (DE); Tobias Heß, Lörrach (DE)

(73) Assignee: A. Raymond et Cie, Grenoble (FR)

( * ) Notice: Subject to any disclaimer, the term of this patent is extended or adjusted under 35 U.S.C. 154(b) by 60 days.

(21) Appl. No.: 15/747,127

(22) PCT Filed: Jul. 18, 2016

(86) PCT No.: PCT/EP2016/001252
§ 371 (c)(1),
(2) Date: Jan. 23, 2018

(87) PCT Pub. No.: WO2017/016652
PCT Pub. Date: Feb. 2, 2017

(65) Prior Publication Data
US 2018/0222429 A1 Aug. 9, 2018

(30) Foreign Application Priority Data

Jul. 24, 2015 (DE) .................. 10 2015 009 367
Jul. 24, 2015 (DE) .................. 20 2015 005 178 U
Dec. 17, 2015 (DE) .................. 10 2015 016 325

(51) Int. Cl.
*B60R 21/216* (2011.01)
*B60R 13/02* (2006.01)
(Continued)

(52) U.S. Cl.
CPC ........ *B60R 21/216* (2013.01); *B60R 13/0206* (2013.01); *F16B 2/08* (2013.01);
(Continued)

(58) Field of Classification Search
CPC ... B60R 21/216; B60R 13/0206; F16B 5/128; F16B 37/0857; F16B 37/043;
(Continued)

(56) References Cited

U.S. PATENT DOCUMENTS 6,394,695 B1 5/2002 Chausset
6,402,188 B1 6/2002 Pasch
(Continued)

FOREIGN PATENT DOCUMENTS

CN 1306481 A 8/2001
DE 4315853 A1 11/1994
(Continued)

OTHER PUBLICATIONS

Machine assisted English translation of JP2006118679A obtained from https://patents.google.com on Feb. 4, 2020, 6 pages.
(Continued)

*Primary Examiner* — Robert Sandy
(74) *Attorney, Agent, or Firm* — Warner Norcross + Judd LLP

(57) ABSTRACT

A fastener for detachably joining a panel to a structure is provided. The fastener exhibits a first connector for joining the fastener with the structure, a second connector for joining the fastener with the panel, wherein the second connector is detachably fastened to the first connector in the normal operating state of the fastener, and a restraining band, whose first end is joined with the first connector, and whose second end is joined with the second connector, wherein at least a portion of the restraining band exhibits a bent shape in the normal operating state of the fastener,
(Continued)

wherein a spacer is situated between the first connector and second connector, and a projection of the spacer protrudes into the space inside the bent portion of the restraining band in the normal operating state of the fastener.

23 Claims, 26 Drawing Sheets

(51) Int. Cl.
*F16B 2/08* (2006.01)
*F16B 21/06* (2006.01)
*F16B 21/07* (2006.01)
*F16B 5/06* (2006.01)
*F16B 37/04* (2006.01)
*F16B 37/08* (2006.01)
*F16B 5/12* (2006.01)

(52) U.S. Cl.
CPC ............ *F16B 5/0657* (2013.01); *F16B 5/128* (2013.01); *F16B 21/065* (2013.01); *F16B 21/075* (2013.01); *F16B 37/043* (2013.01); *F16B 37/0857* (2013.01)

(58) Field of Classification Search
CPC .... F16B 21/075; F16B 21/065; F16B 5/0657; F16B 2/08
See application file for complete search history.

(56) References Cited

U.S. PATENT DOCUMENTS

| | | | |
|---|---|---|---|
| 6,431,585 B1* | 8/2002 | Rickabus | B60R 21/215 24/114.05 |
| 2005/0285375 A1 | 12/2005 | Kawai et al. | |
| 2007/0216139 A1 | 9/2007 | Mazanek et al. | |
| 2008/0235919 A1 | 10/2008 | Giddings et al. | |
| 2011/0221170 A1 | 9/2011 | Thurston et al. | |

FOREIGN PATENT DOCUMENTS

| | | |
|---|---|---|
| DE | 102009049361 A1 | 4/2011 |
| FR | 2780115 A1 | 12/1999 |
| JP | 2006118679 A | 5/2006 |
| RU | 2434166 C2 | 11/2011 |
| WO | 0140667 A1 | 6/2001 |

OTHER PUBLICATIONS

Machine assisted English translation of DE4315853A1 obtained from https://patents.google.com on Nov. 12, 2019, 6 pages.
Machine assisted English translation of DE102009049361A1 obtained from https://patents.google.com on Nov. 12, 2019, 10 pages.

* cited by examiner

FASTENER FOR DETACHABLY CONNECTING A PANEL TO A STRUCTURE, COVER PANEL FOR AN AIRBAG AND VEHICLE COMPRISING A STRUCTURE AND AN AIRBAG

TECHNICAL FIELD OF THE INVENTION

The invention relates to a fastener for detachably joining a panel to a structure. The invention further relates to a cover panel for an airbag, which is suitable for covering an airbag arranged between the cover panel and a structure of a vehicle. The invention also relates to a vehicle with a structure and an airbag and just such a cover panel.

BACKGROUND OF THE INVENTION

Known from WO 01/40667 A1 is a fastener for detachably joining a panel to a structure, which exhibits a first connector for joining the fastener with the structure, and a second connector for joining the fastener with the panel, wherein the second connector is joined with the first connector in the normal operating state of the fastener. A restraining band is provided, whose first end is joined with the first connector, and whose second end is joined with the second connector, wherein at least a portion of the restraining band exhibits a bent shape in the normal operating state of the fastener shown on FIG. 5 C.

Known from US 2008/0235919 A1 is a fastener for detachably joining a panel to a structure, wherein the fastener exhibits a first connector for joining the fastener with the structure, and a second connector for joining the fastener with the panel, wherein the second connector is detachably joined with the first connector in the normal operating state of the fastener (see FIG. 1). The construction known from US 2008/0235919 A1 provides two restraining bands, whose first end is joined with the first connector, and whose second end is joined with the second connector. In each of the two restraining bands, at least a portion of the restraining band exhibits a bent shape in the normal operating state of the fastener (FIG. 1). The fastener described in US 2008/0235919 A1 is used to replaceably join a panel supporting an airbag with a structure of a vehicle. It is to be possible to easily change out the panel once the airbag has been activated. As further described in US 2008/0235919 A1, it is desirable to restrict the movement of the panel once the airbag has been deployed.

BRIEF SUMMARY OF THE INVENTION

Against this backdrop, the object of the invention was to create a fastener for detachably joining a panel to a structure that offers a better possibility of influencing the movement of the panel in relation to the structure after the connection has been detached. The object was also to further develop a cover panel for an airbag, which is suitable for [missing German words] an airbag so that the movement of the cover panel in relation to the structure of the vehicle can be better controlled when the airbag is deployed. In addition, the object was to propose a vehicle with a structure and an airbag and just such a cover panel.

The invention is achieved by the subject matters in claims 1, 4, 5, 11 and 12. Advantageous embodiments are described in the subclaims following the latter.

In a first aspect, the invention proceeds from the basic idea of providing a spacer for the fasteners according to the invention, which is situated between the first connector and second connector. The spacer exhibits a projection that protrudes into the space inside the bent portion of the restraining band in the normal operating state of the fastener. As a consequence, the invention makes it possible to establish a contact between the projection of the space and the restraining band when detaching the connection between the second connector and first connector, for example when an airbag deploys and presses the panel covering it away from the structure as it unfolds.

For example, this contact between the restraining band and the projection of the spacer can be used to generate a pivot, around which the second connector can turn relative to the first connector. For example, embodiments are conceivable in which the fastener according to the invention is used for detachably joining a cover panel for an airbag with a structure, and in which how the airbag is deployed causes the second connector from detaching from the first connector by moving in a linear direction relative to the first connector. Because the spacer exhibits a projection that protrudes into the bent portion of the restraining band, a linear movement by the first connector relative to the second connector makes it possible for the projection to come into contact with part of the bent portion of the restraining band. A pivot can then arise at this contact point or at this contact surface, around which the second connector rotates relative to the first connector. This results in a first option for influencing the movement of the second connector relative to the first connector, and hence also the movement of the panel relative to the structure. In a preferred embodiment, it is further conceivable that the restraining band designed at least partially with a bent shape move in a direction toward a stretched alignment of the restraining band (a linearly stretched shape of the restraining band) given a linear movement of the second connector relative to the first connector. The portion of the restraining band exhibiting a bent shape is here moved in a direction toward a linear alignment. This can take place accompanied by a reduction in space that initially existed inside of the bent portion of the restraining band. However, since the projection of the spacer is located in this space, reducing the space while linearizing the bent portion of the restraining band causes the restraining band to come into contact with the projection of the spacer. In this way as well, a pivot can be obtained around which the second connector can turn relative to the first connector. This also offers the option of influencing the movement of the first connector relative to the second connector.

Within the framework of the specification of the present invention, reference is made to a detachable fastening on the one hand and to a joining on the other. "Detachable fastening" is understood to mean that the panel is fastened with the structure in such a way that the panel does not detach from the structure in a normal operating state. At the same time, however, there is a defined operating state, for example the deployment of an airbag covered by the panel or—in another conceivable area of application for the invention—when the panel is pulled away from the structure upon exposure to a force exceeding a previously determined force level, in which the panel detaches from the structure, and is then only held on the structure by the restraining band. Therefore, detaching the fastening between the panel and structure is a desired operating state of the fastener according to the invention. By contrast, "joining" is used to describe a fixed connection between two parts, which is not to be detached in any operating state of the fastener. This does not rule out that such a connection can also be detached. For example, this can be provided in cases where the panel is to be completely separated from the structure, e.g., while being serviced. However, the selected type of connection between the fastener and structure and type of connection between the fastener and panel is intended to ensure that it remains intact, while the detachable fastening between the panel and structure is detached. In like manner, the restraining band provided according to the invention is to be joined at its first end with the first connector, and at its second end with the second connector, wherein these connections are so fixed in design that they do not detach when the detachable fastening between the panel and structure is detached. It is especially preferred that the connection between the first end of the restraining band and first connector be designed so that the first end of the restraining band cannot move relative to the first connector. In a preferred embodiment, the connection between the second end of the restraining band and second connector is likewise designed so that the second end cannot move relative to the second connector.

The fastener according to the invention exhibits a restraining band with a first end and a second end. The restraining band is an object that extends in a longitudinal direction, whose extension in the longitudinal direction is greater than its width and height. The term "longitudinal direction" is here not to be construed to mean that the restraining band absolutely has to be extended along a line. The longitudinal direction only describes the circumstance that the restraining band extends along a path (that can also exhibit arcs). The restraining band is flexible in design at least along a partial section of its longitudinal extension, so that it can transitioned from a first shape into a second shape under exposure to a force without breaking. Conceivable here are embodiments in which the flexibility of the restraining band changes along the longitudinal extension. For example, it is conceivable that the first end and/or the second end be distinctly more rigid in design than a section of the restraining band lying between the first end and the second end. Having the first end or second end be rigid in design makes it easier to join the first end and first connector, or join the second end and second connector. The shape of the cross sectional surface of the restraining band (the surface perpendicular to the longitudinal extension at the respective location) can be round, elliptical, square, rectangular, polygonal or have some other shape.

The restraining band is designed in such a way that at least a portion of the restraining band exhibits a bent shape in the normal operating state of the fastener. In a preferred embodiment, the first end extends along a straight line and/or the second end of the restraining band extends along a straight line, while the portion of the restraining band lying between the first end and second end exhibits a bent shape in the normal operating state of the fastener. The movement of the panel relative to the structure while the fastening is being detached can be influenced by the selected flexibility or rigidity of the restraining band along its longitudinal extension, but also by the shape selected for it, in particular the section in which the restraining band potentially extends along a straight line, and the areas in which the restraining band exhibits a bent shape. In particular, the suitable selection of these parameters makes it possible to determine at which point or in which area of the restraining band a corresponding shape and corresponding flexibility can exert an influence on the movement of the first connector relative to the second connector while detaching the connection.

In a preferred embodiment, the restraining band is designed in such a way that its bent shape causes the alignment of the restraining band to change by more than 45°, in particular by approx. 90°, or especially preferably by more than 90°. In a preferred embodiment, the restraining band is designed in such a way that its bent shape causes the alignment of the restraining band to change by less than 180°, in particular by approx. 90°, or especially preferably by less than 90°.

In the fastener according to the invention, a spacer is arranged between the first connector and second connector. The spacer can be detachably fastened to the first connector, and detachably fastened to the second connector. However, it is especially preferred that the spacer be joined with one of the two connectors and only detachably fastened to the other of the two connectors, so as to provide the detachable fastening between the second connector and first connector. It is especially preferred that the spacer also be designed as a single piece with the respective connector with which it is fixedly joined, for example if this first connector is fabricated in a casting process, especially preferably via injection molding.

In a preferred embodiment, the spacer can be used to space the first connector apart from the second connector. Known in the art are embodiments in which the first connector and second connector directly adjoin each other, for example the embodiments shown in WO 01/40667 A1 and US 2008/0235919 A1. This yields a flat fastener. Such embodiments can essentially also be achieved with the fastener according to the invention if the spacer is designed with a very slight longitudinal extension. In a preferred embodiment, however, the spacer exhibits a longer length. In the preferred area of application for the invention, specifically fastening a cover panel for an airbag to a structure of a vehicle, embodiments have become known in practice in which a receptacle was provided on the panel side for the connector of the fastener allocated thereto, which extends very far into the interior of the panel with a bent design. This receptacle becomes necessary, since the fastener is very flat in design. In such an embodiment, however, the receptacle on the cover panel blocks lines or hoses traversing inside of the cover panel. The spacer provided in the fastener according to the invention makes it possible to space the first connector apart from the second connector. As a result, the fastener according to the invention is taller in this preferred embodiment than the fastener known from prior art. At the same time, however, it enables a narrow design for the spacer, so that cables and hoses traversing inside a bent cover panel can be routed past the spacer. The receptacle of the connector allocated thereto on the cover panel of the preferred embodiment can be made flatter in design, and thus does not protrude into the interior of the bent cover panel. In a preferred embodiment, the spacer exhibits a height of more than 5 mm, in particular of more than 10 mm, and very especially preferably of more than 20 mm.

The cross sectional shape of the spacer need not be identical along its longitudinal extension. For production-related reasons, but also given the desire to influence the flow of forces through the spacer, it is conceivable to have the cross sectional shape of the spacer vary significantly along its longitudinal extension. In particular in an embodiment in which the first connector exhibits an essentially flat surface facing the second connector, and the spacer is fixedly designed with the first connector, especially preferably as a single piece, all material that rises over this surface in the direction toward the second connector is understood as belonging to the spacer.

In a preferred embodiment, the spacer is a cube or cylinder or a support shaped other than a cube or cylinder.

The spacer also already has a variable cross sectional shape along its longitudinal extension because it exhibits a projection that protrudes into the space inside the bent portion of the restraining band in the normal operating state of the fastener. This projection extends in a direction perpendicular to the longitudinal extension of the spacer. The cross sectional shape of the projection need here not be constant in the direction of its extension perpendicular to the longitudinal extension of the spacer. It is especially preferred that the cross sectional surface of the projection diminish as the distance from the remaining portions of the spacer increases. Embodiments are here conceivable in which the projection is symmetrically designed relative to an axis located perpendicular to the longitudinal extension of the spacer. This makes sense in particular when the bent portion of the restraining band also exhibits an arc symmetrical to an axis. In a preferred embodiment, however, the projection is designed asymmetrically to all axes extending perpendicular to the longitudinal extension of the spacer. It is especially preferred that the projection have a nose-like design.

In a preferred embodiment, a gap is provided between the projection and bent portion of the restraining band in the normal operating state of the fastener. In the preferred embodiment, the projection thus does not contact the restraining band at any location in the normal operating state of the fastener. In a preferred embodiment, the projection exhibits a surface facing away from the first connector in the normal operating state of the fastener, and a gap is provided between the surface facing away from the first connector and a surface of the restraining band facing the surface facing away from the first connector.

In an especially preferred embodiment, the gap exhibits a constant gap width for at least part of the extension of the bent portion. It is especially preferred that the gap exhibit a constant gap width between the projection and bent portion of the restraining band over the entire extension of the bent portion of the restraining band. The gap width especially preferably measures 0.5 mm and/or more than 0.5 mm, especially preferably more than 1 mm. In a preferred embodiment, the area of the gap width that is constant measures less than 10 mm, especially preferably less than 5 mm, especially preferably less than 3 mm, and very especially preferably less than 1.5 mm.

In a preferred embodiment, the restraining band is completely arranged on one side of a line that joins together the first end of the fastening band and second end of the fastening band. This refers to the point at which the first end is joined with the first connector, or the second end is joined with the second connector. In a very especially preferable embodiment, the spacer is primarily located on the opposite side of this line, wherein only the projection of the spacer crosses the line, and protrudes into the side of the line belonging to the restraining band.

In a second aspect of the invention that can in particular be combined with the first one, a fastener according to the invention is designed in such a way that the first end of the fastening band extends essentially in a first direction in the normal operating state of the fastener, while the second end of the restraining band extends essentially in a second direction in the normal operating state of the fastener, wherein the first direction does not run parallel to the second direction, and the included angle between the first direction and second direction is greater than 5°, in particular greater than 20°, especially preferably greater than 45°, and especially preferably greater than 85°. It is especially preferred that the included angle between the first direction and second direction be less than 135°, especially preferably less than 120°, and especially preferably less than 95°.

In the embodiments of fasteners known from WO 01/40667 A1 and US 2008/0235919 A1, the first end of the restraining band is joined with the first connector, and the second end of the restraining band is joined with the second connector, in such a way that the two ends essentially run parallel to each other in the normal operating state of the fastener. In particular, this also has to do with the fact that the restraining band extends laterally away from the respective connector. As a result, a large installation space is required for installing this type of a fastener. In the second aspect of the invention now described, the first direction in which the first end extends in the normal operating state is not parallel to the second direction in which the second end of the restraining band extends in the normal operating state. The included angle between the two directions is greater than 5°. As a result, at least one of the ends of the restraining band in this second aspect of the invention does not extend purely laterally from the connector allocated thereto, but rather at least at an angle relative to the purely lateral extension. The larger the selected angle in relation to the lateral extension from a connector, the more the restraining band extends in the vertical (the direction leading from the first connector to the second connector) with at least a portion of its extension, and no longer as much in the horizontal (the lateral direction to a connector). As a result, the space occupied by the fastener in the horizontal direction can be reduced. This is advantageous in particular in cases where the fastener is to extend more in the vertical direction, especially preferably in those embodiments in which it exhibits a spacer according to the first aspect of the invention.

In a preferred embodiment of the second aspect of the invention, the first end of the restraining band is joined with the first connector so as to extend essentially in the direction toward the second connector. In an especially preferred embodiment of this embodiment, the second end of the restraining band is joined with the second connector so as to extend essentially laterally from the second connector, and hence at a right angle to the direction pointing toward the first connector, away from the second connector. In a very especially preferable embodiment of this embodiment, a bent portion of the restraining band joins the first end configured in this way with the second end designed as just described so that the bent portion of the restraining band as viewed laterally from above takes the form of a circular ring segment extending over an angle of 45°, or in an alternative design forms a loop that proceeds from the first end and initially extends laterally away from the connectors, and is then returned in an arc so as to comprise the second end there.

In a third aspect of the invention that can optionally be combined with the first and/or second aspect of the invention, a spacer is situated between the first connector and second connector, wherein the spacer extends along a longitudinal direction, and the ratio (LP/LR) between the longitudinal extension (LP) of the spacer in the direction of the longitudinal direction and the length of the restraining band (LR) is defined by the following formula: $1<LP/LR<2$.

In particular, the length of the restraining belt (LR) is here understood as the extension of the restraining band potentially also extending along a bent path between the point at which its first end is joined with the first connector and the point at which its second end is joined with the second connector. The transition between the end allocated to the restraining band and the connector, in particular given an end and connector designed as a single piece, is understood in particular as the end point of the last portion of the restraining band before the connector, which itself exhibits a constant cross sectional form. For example, if a restraining band designed as a single piece with the connector is provided with a rectangular cross section in its last portion before the connector, and this cross section changes in the transition to the connector, the end point of the restraining band starting at which the length of the restraining band (LR) is to be measured constitutes the end of this portion with a rectangular cross section.

The structural designs known from US 2008/0235919 A1 and WO 01/40667 A1 exhibit restraining bands that have a very large length in relation to the vertical distance between the first connector and second connector. Among other things, the length of the restraining band defines how far the panel can move away from the structure once the fastening is detached without an action controlling the movement taking place. In the embodiments known from US 2008/0235919 A1 and WO 01/40667 A1, the restraining band only exerts an influence on the direction in which the panel moves away from the structure when the restraining band approaches its tightened, tensioned alignment (its alignment along a straight line). Up until that point, the panel can move in nearly a completely free manner relative to the structure. The longer the distance for which the panel must move relative to the structure given a detached fastening before the restraining band assumes its tightened, tensioned position, the further the distance the panel can move in basically a chaotic manner in relation to the structure. If the length of the restraining band is shortened in the sense of the third aspect of the invention described here, this reduces the distance for which the panel can freely move in relation to the structure given a detached fastening.

In a preferred embodiment of all three aspects of the invention, the first connector has a clip suitable for joining with the structure. A clip is most often characterized by at least one restraining element, which exhibits a barb designed as an undercut in relation to an insertion direction (used representatively for recess, rearward-facing end surface of a wing; often also referred to as snap hook), and has a resilient design in the direction perpendicular to the insertion direction. As a result, when inserting the clip into a hole whose cross section is smaller than the cross section of the clip in the area directly adjoining the barb, the connecting element is initially pressed in the direction perpendicular to the insertion direction via the interaction of an inclined surface adjoining the barb, and snaps back into its initial position after the transitional point between the inclined surface and barb has passed the opening. The clip is then prevented from being pulled out in the direction opposite the insertion direction by virtue of the fact that, due to the larger cross section of the clip, the barb hits the wall into which the hole with a smaller cross section was introduced. Clips have become popular in particular for fastening panels to structures, in particular in the area of vehicles, in particular in the automotive field, since they enable a quick assembly and frequently can be fastened without using tools, such as screwdrivers or rivet guns.

In a preferred embodiment, the clip of the first connector exhibits an access opening, which permits access to connecting elements joined with the barbs of the clip. The access opening preferably extends from the side of the first connector facing the second connector and through the first connector. The barbs of the clip are preferably provided on the side facing away from the second connector. As a consequence, the access opening can make it possible to recognize or check the position of the barbs even from the side of the first connector lying opposite the barbs, i.e., from the side of the second connector. In a preferred embodiment, the access opening is situated centrally transverse relative to the longitudinal extension of the clip. In an especially preferred embodiment, an access opening is also provided in the second connector, preferably an access opening that extends from the side of the second connector remote from the first connector and through the second connector toward the first connector. Additionally or alternatively, in embodiments that exhibit a spacer, no material is provided in the part of the fastener that exhibits the spacer, in alignment with the access opening of the first connector and/or the second connector, or if any material is provided in this area, this material in alignment with the access opening of the first connector and/or second connector exhibits its own access opening. This makes it possible to access the connecting elements of the clip from the side of the fastener spaced apart from the barbs. For example, when looking through the access opening (or the access openings aligned with each other), this makes it possible to determine how the connecting elements of the clip are situated relative to the arrangement of the fastener lying in the visual field of the observer. For example, it is possible to determine whether the connecting elements, and hence the barbs present on the connecting elements of the clip, engage the structure from behind.

The invention also creates a system that encompasses a fastener according to the invention and an insertion element. The clip exhibits a channel, whose inner contour can be altered as a function of the distance between two barbs, wherein the barbs have a released state and a compressed state, and the insertion element can be introduced into the channel when the barbs are in the released state. It is especially preferred that the outer contour of the insertion element be larger than the inner contour of the channel in the compressed state. As a result, it can be determined whether a reliable engagement is present behind the barbs. If the insertion element cannot be introduced into the channel, the outer contour of the insertion element is larger than the present inner contour of the channel, resulting in a state in which the distance between the two barbs prevents the barbs from reliably engaging behind the structure. A so-called "proof of installation" can be performed in this way. If the insertion element cannot be introduced into the channel, the barbs are not in a position in which the structure is engaged from behind. With the insertion element introduced, the barbs can also be held in the position that engages the structure from behind.

The term "inner contour" and "outer contour" encompass a (partial) circumference of the channel transverse to its longitudinal extension. The term "contour" here does not necessarily encompass a complete circumference transverse to the longitudinal extension, but rather also an envelope transverse to the longitudinal extension or a relevant distance transverse to the longitudinal extension of the channel, from which conclusions can be drawn about the reliable rearward engaging of the barbs. The term "contour" thus also encompasses a predetermined distance between two elements that must be present for the insertion element to be introduced into the channel.

In a preferred embodiment, the barbs are joined with connecting elements of the clip, or the barbs are molded onto the connecting elements of the clip, and one or more sections on a connecting element comprise an inner contour section of the channel. The "inner contour" can thus be reduced to the distance between the connecting elements of the two barbs. After the clip has been snapped in, the barbs must be brought into a rearward engaging position, wherein the respective connecting elements exhibit a greater distance from each other than in a case where the barbs are introduced into the structure. If the clip snaps in, and the barbs hence engage the structure from behind, the distance between the connecting elements becomes larger; the insertion element can be introduced into the channel.

In a preferred embodiment, the channel incorporates threaded sections, which can be made to engage the insertion element, which exhibits a thread. As a consequence, the insertion element can be designed as an element that exhibits a male thread. Apart from the ability to determine whether the insertion element can be completely pushed into the channel, configuring the insertion element with a thread makes it possible to screw in the helical insertion element with a predetermined torque. If the barbs do not engage the structure from behind, the channel is too small, or the contour does not exhibit the corresponding size, so that the insertion element cannot be introduced into the channel with the preset torque. In an especially preferred embodiment, the insertion element is made out of metal. In an especially preferred embodiment, the insertion element is made out of plastic. In the sense of the invention, the term "threaded sections" encompasses contact areas formed on the channel that come to engage the thread formed on the insertion element, and can interact with the thread of the insertion element.

In a preferred embodiment, the insertion element is a plug element. As a result, the proof of installation can be verified by virtue of the fact that the plug element can only be inserted or immersed into the channel if the barbs engage the structure from behind. In an especially preferred embodiment, the insertion element designed as a plug element encompasses a plastic or consists of the latter. In an especially preferred embodiment, the plug element can latch with the fastener, in particular with the second connector of the fastener, so that once "performed", the proof of installation cannot be called into question by removing the plug element.

In a preferred embodiment, a mount for holding the insertion element is formed on the clip. In this way, a fastener that has not yet been installed can be easily handled together with the insertion element being held on the fastener. An easily to handle unit of the system can be created that encompasses the fastener and an insertion element held by means of the mount.

The insertion element can encompass several parts or sections. In particular, the insertion element can exhibit two parts or several parts, which together yield the insertion element. In this regard, the term "insertion element" also encompasses a multipart element, in which the individual parts or sections are not necessarily joined with each other, but rather can be held or guided in the effective direction (in the longitudinal direction of the channel). For example, a multipart insertion element potentially configured as a plug element can exhibit several plug elements acting in the same effective direction (longitudinal direction of the channel). The multipart configuration of the insertion element makes it possible to avoid arising forces that would result in breakage given a single-piece design, for example.

In an embodiment, it can also be provided that the insertion element exhibit a predetermined breaking point, which breaks when exposed to a predetermined force, so as to provide a predetermined location for a break.

In a preferred embodiment, the insertion element can be gated onto the receptacle of the first connector via gated connections. The gated connections can assume an additional guiding function for the insertion element. The gated connections can keep the insertion element in contact.

In a preferred embodiment, lateral stops are provided for the insertion element, which can additionally guide the insertion element. The stops can be gated onto the receiving frame of the second connector. This diminishes or avoids any impediments in the process of detaching from the first and second connector.

In a preferred embodiment, the insertion element is at least partially enveloped by the spacer, thereby yielding an especially compact fastener, in which in particular no changes take place by comparison to conventional fasteners, without any proof of installation. However, it can also be provided that the insertion element or portions thereof can project over the fastener at least partially in an extension of the space, thereby enabling a simple assessment of whether the insertion element could be inserted into the channel, since the insertion element is/remains visible from outside.

In a preferred embodiment, the second connector exhibits an access opening on the insertion element, wherein the access opening can be situated essentially centrally over the channel. As a result, a proof of installation can be achieved even in a normal operating state, in which the restraining band is not bent back, but rather the position of the first connector is fixed relative to the second connector.

In a preferred embodiment, the first connector has a two-part configuration, and exhibits a base body comprised of a first material, for example a plastic material, while the clip is designed as a separate element, especially preferably as an element made out of another material, for example another plastic, with metal here being especially preferred. The clip can be joined with the base body by being crimped with the base body. However, it is also conceivable that the clip be clamped to the base body of the first connector via clamps.

The use of a clip is especially suitable for the first connector, so as to establish a connection with the structure. It is conceivable in a preferred embodiment that the second connector have a clip suitable for connection with the panel. However, a different technology that can be designed to reflect the second connector is often desired for joining the second connector with a receptacle on the panel. For example, the second connector can accommodate a head, which is pushed into a receptacle in the panel from the side. During the assembly of a cover panel for an airbag, it is conceivable that the cover panel and second connector of the fastener according to the invention be joined together in a first step, very possibly at a supplier. In this state, more space is often present. The assembler has easier access to the cover panel. For this reason, the type of connection between the second connector and a receptacle of the cover panel can be selected in such a way as to withstand the expected loads especially well. Not as much emphasis is here potentially placed on the ability to easily mount the second connector on the receptacle of the cover panel. However, mountability does play a big role in fastening a cover panel prepared in this way with the structure of a vehicle, for example a roof rail, when a cover panel for an airbag is to be assembled. This is why clips are preferred for establishing the connection between the first connector and the structure, since they can be readily and reliably mounted even given a tight installation space.

In a preferred embodiment, the first end of the spacer is rigidly joined with the first connector, in particular designed as a single piece with the first connector, and its second end is detachably fastened with the second connector. As a result, when the fastening is detached, the spacer along with the first connector moves relative to the second connector (wherein this embodiment initially leaves it open as to whether the first connector is moved relative to the second connector or the second connector is moved relative to the first connector). In an alternative embodiment, the first end of the spacer is rigidly joined with the second connector, especially preferably designed as a single piece with the latter, and its second end is detachably fastened with the first connector. In this embodiment, the spacer with the second connector moves relative to the first connector (wherein this embodiment also initially leaves it open as to whether the second connector moves relative to the first connector or the first connector moves relative to the second connector).

In an especially preferred embodiment, the first end of the spacer is rigidly joined with the first connector, wherein a head protrudes from the second end of the spacer and is detachably accommodated between two clamps, which are provided on the second connector. Interaction between the head and two clamps holding it makes it possible to provide a good and fixed attachment in the normal operating state, but one that can also be easily detached once a certain level of force has been reached.

In an especially preferred embodiment, the first end of the spacer is rigidly joined with the second connector, wherein a head protrudes from the second end of the spacer and is detachably accommodated between two clamps, which are provided on the first connector. Interaction between the head and two clamps holding it makes it possible to provide a good and fixed attachment in the normal operating state, but one that can also be easily detached once a certain level of force has been reached.

In a preferred embodiment, the first end of the spacer is rigidly joined with the first connector, wherein a head protrudes from the second end of the spacer and is detachably accommodated between two clamps, which are provided on the second connector, wherein the second connector exhibits a flat surface that has a hole and faces the first connector, and the two clamps engage through the hole in the direction toward the first connector, wherein the head is held by the two clamps above the hole and on the side of the surface on which the first connector is also situated.

In a preferred embodiment, the first end of the spacer is rigidly joined with the second connector, wherein a head protrudes from the second end of the spacer and is detachably accommodated between two clamps, which are provided on the first connector, wherein the first connector exhibits a flat surface that has a hole and faces the second connector, and the two clamps engage through the hole in the direction toward the second connector, wherein the head is held by the two clamps above the hole and on the side of the surface on which the second connector is also situated.

In an especially preferred embodiment, the first end of the spacer is rigidly joined with the first connector, wherein a head protrudes from the second end of the spacer and is detachably accommodated between two clamps, which are provided on the second connector, wherein the second connector exhibits a flat contact surface for contacting the panel, which is located in a plane, and wherein the two clamps are at least partially arranged on the side of the plane on which the first connector is also situated. It is especially preferred that the two clamps be arranged in such a way that the head is held between the clamps completely on the side of the plane on which the first connector is also situated. Arranging the head above the plane in this way offers a variety of options for moving out the head between the clamps without the head becoming blocked or jammed with other elements of the first connector.

In an especially preferred embodiment, the first end of the spacer is rigidly joined with the second connector, wherein a head protrudes from the second end of the spacer and is detachably accommodated between two clamps, which are provided on the first connector, wherein the second connector exhibits a flat contact surface for contacting the panel, which is located in a plane, and wherein the two clamps are at least partially arranged on the side of the plane on which the second connector is also situated. It is especially preferred that the two clamps be arranged in such a way that the head is held between the clamps completely on the side of the plane on which the second connector is also situated. Arranging the head above the plane in this way offers a variety of options for moving out the head between the clamps without the head becoming blocked or jammed with other elements of the first connector.

In a preferred embodiment, the fastener consists of plastic, and in a preferred embodiment, the fastener is fabricated in an injection molding process. In an alternative embodiment, the fastener exhibit various materials. For example, the second connector and restraining band can be fabricated out of a first plastic, while the first connector exhibits a base body also fabricated out of a second plastic different than the first, and exhibits a clip made out of metal and crimped with the base body.

In particular, the cover panel according to the invention for an airbag exhibits a fastener according to the invention, which is joined with the cover panel in such a way that the second connector is joined with the cover panel. Precisely in the preferred area of application for the side or head airbag, in particular in the case of curtain-type airbags, it has proven beneficial to control the movement of the panel relative to the structure, most often a roof rail of the vehicle or the A-pillar of the vehicle. This can be effectively realized in particular with the fastener according to the invention. The fastener according to the invention allows the cover panel to swivel in the direction toward the roof liner. In this short movement path, the risk that the swiveling cover panel will hit a passenger in the vehicle is very low.

In a preferred embodiment, the cover panel essentially extends along a longitudinal direction. In an especially preferred embodiment, the plane in which the bent portion of the restraining band lies extends in a direction perpendicular to the longitudinal extension of the cover panel.

The vehicle according to the invention exhibits a structure, especially preferably a frame and an airbag and a cover panel according to the invention for the airbag. The airbag is arranged between the cover panel and structure, and the fastener is fastened to the structure by virtue of joining the first connector with the structure.

It is especially preferred that the fastener according to the invention be used for detachably fastening a panel to a structure of a vehicle, especially preferably of an automobile.

BRIEF DESCRIPTION OF THE SEVERAL VIEWS OF THE DRAWINGS

The invention will be explained in more detail below based on a drawing, which presents only exemplary embodiments of the device according to the invention.

Shown there are.

DETAILED DESCRIPTION OF THE INVENTION

Figure 1:
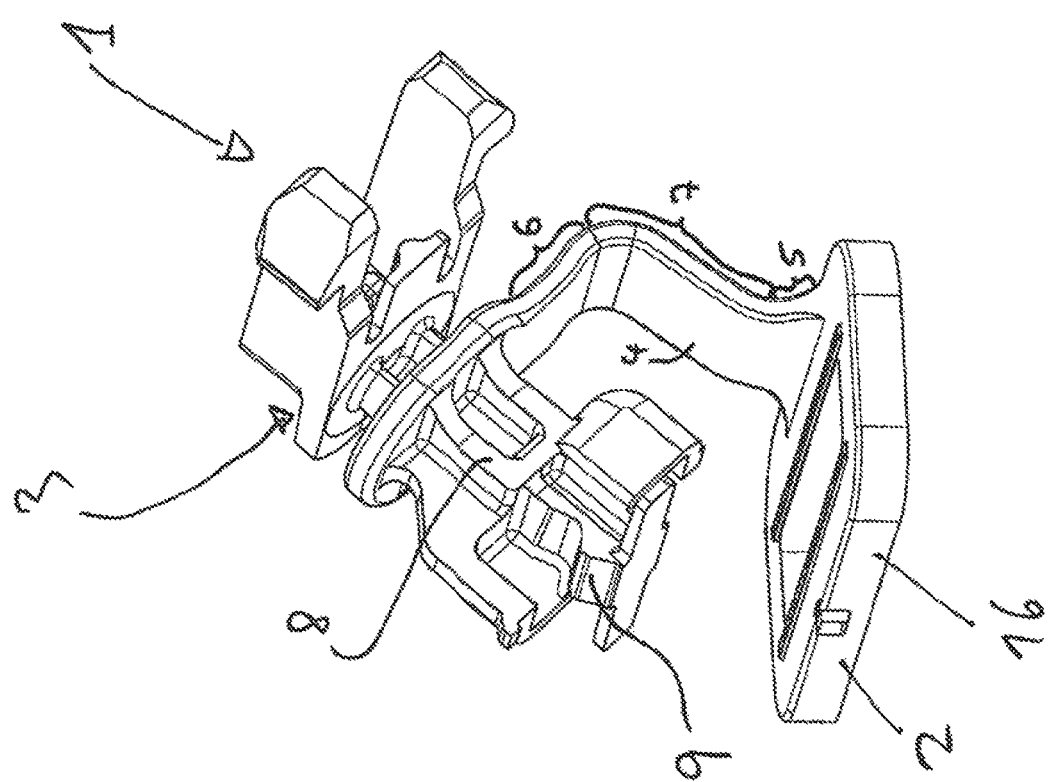
FIG. 1 a first embodiment of the fastener according to the invention in a perspective view without built-in clip of the first connector, which is depicted on FIG. 2.
Figure 3:
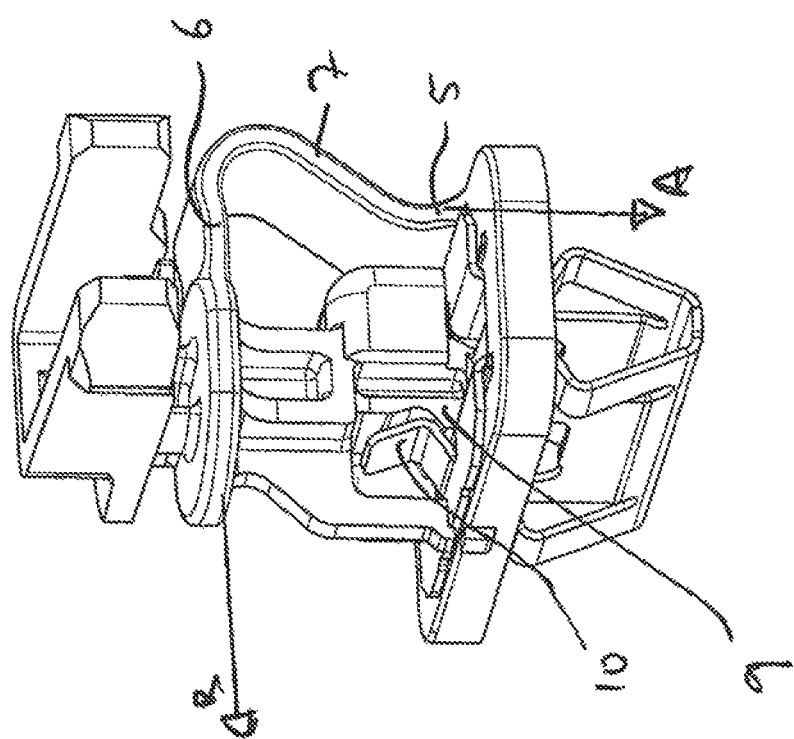
FIG. 3 the fastener according to the invention on FIG. 1 in an assembled form (in a normal operating state)

FIG. 1 shows a fastener 1 according to the invention for detachably fastening a panel (not depicted on FIG. 1) to a structure (not depicted on FIG. 1), wherein the fastener 1 exhibits a first connector 2 for joining the fastener with the structure, and a second connector 3 for joining the fastener with the panel, wherein the second connector 3 is detachably fastened with the first connector 2 in the normal operating state of the fastener 1 (see FIG. 3). The fastener 1 also exhibits a restraining band 4. The restraining band 4 has a first end 5, in the embodiment depicted here a first end 5 extending along a straight line. The first end 5 is rigidly joined with the first connector 2 by having the first end 5 be designed as a single piece with the first connector 2. The restraining band 4 further exhibits a second end 6, which in the embodiment depicted here also extends along a straight line. The second end 6 is rigidly joined with the second connector 3 by being designed as a single piece with the connector 3. The part 7 of the restraining band 4 lying between the first end 5 and second end 6 exhibits a bent shape in the normal operating state of the fastener shown on FIG. 3.

Provided between the first connector 2 and second connector 3 is a spacer 8. The spacer 8 is rigidly joined with the second connector 3 by having its first end be designed as a single piece with the second connector 3. A head 9 protrudes at the opposite, second end of the spacer 8. In a normal operating state, the latter is detachably accommodated between two clamps 10, 11 of the first connector 2. The base body 16 of the first connector 2 exhibits a flat surface that faces the second connector 3 and has a hole, wherein the second clamps 10, 11 engage through the hole in the direction toward the second connector 3, wherein the head 9 is held by the two clamps 10, 11 above the hole and on the side of the surface on which the second connector 3 is also situated.

Figure 2:
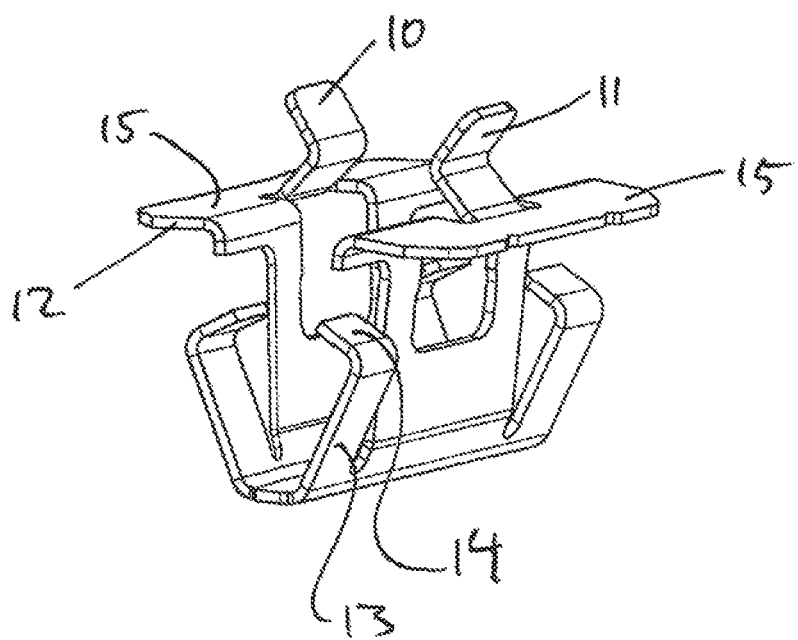
FIG. 2 a perspective view of a clip, which can be used as part of the first connector of the fastener according to the invention on FIG. 1.

As evident from FIG. 3 and a combined review of FIGS. 1 and 2, the first connector 2 exhibits a clip 12. The latter exhibits four connecting elements 13 that each have a barb (snap hook) 14. Contact surfaces 15 of the clip 12 abut against a contact surface of a base body 16 of the first connector 2 (see FIG. 3). In this position, it is held by latching lugs (not shown in any more detail), which are provided on the base body 16. As evident from the perspective view on FIG. 4, the barbs 14 are spaced apart from the underside of the base body 16. They engage behind the structure 25 with which the fastener according to the invention fastens the panel 20.

As evident from FIG. 3, the first end 5 of the fastening band 4 essentially extends in a first direction A in the normal operating state of the fastener 1, and the second end 6 of the restraining band 4 essentially extends in a second direction B in the normal operating state of the fastener 1 depicted on FIG. 3. The first direction A is not parallel to the second direction B. The included angle between the first direction A and second direction B is greater than 5°, and in the embodiment depicted on FIG. 3 measures about 90°.

The fastener 1 according to the invention exhibits a flat contact surface to be contacted with the structure (the underside of the base body 16). This contact surface is arranged in a plane. The two clamps 10, 11 of the clip 12 are arranged completely on the side of the plane on which the second connector 3 is also situated. In the embodiment shown here, the base body 16 exhibits a surface that faces the second connector 3 in the normal operating state, and is also located in a plane, wherein the two clamps 10, 11 are arranged completely on the side of this plane, on which the second connector 3 is also situated.

Figure 4:
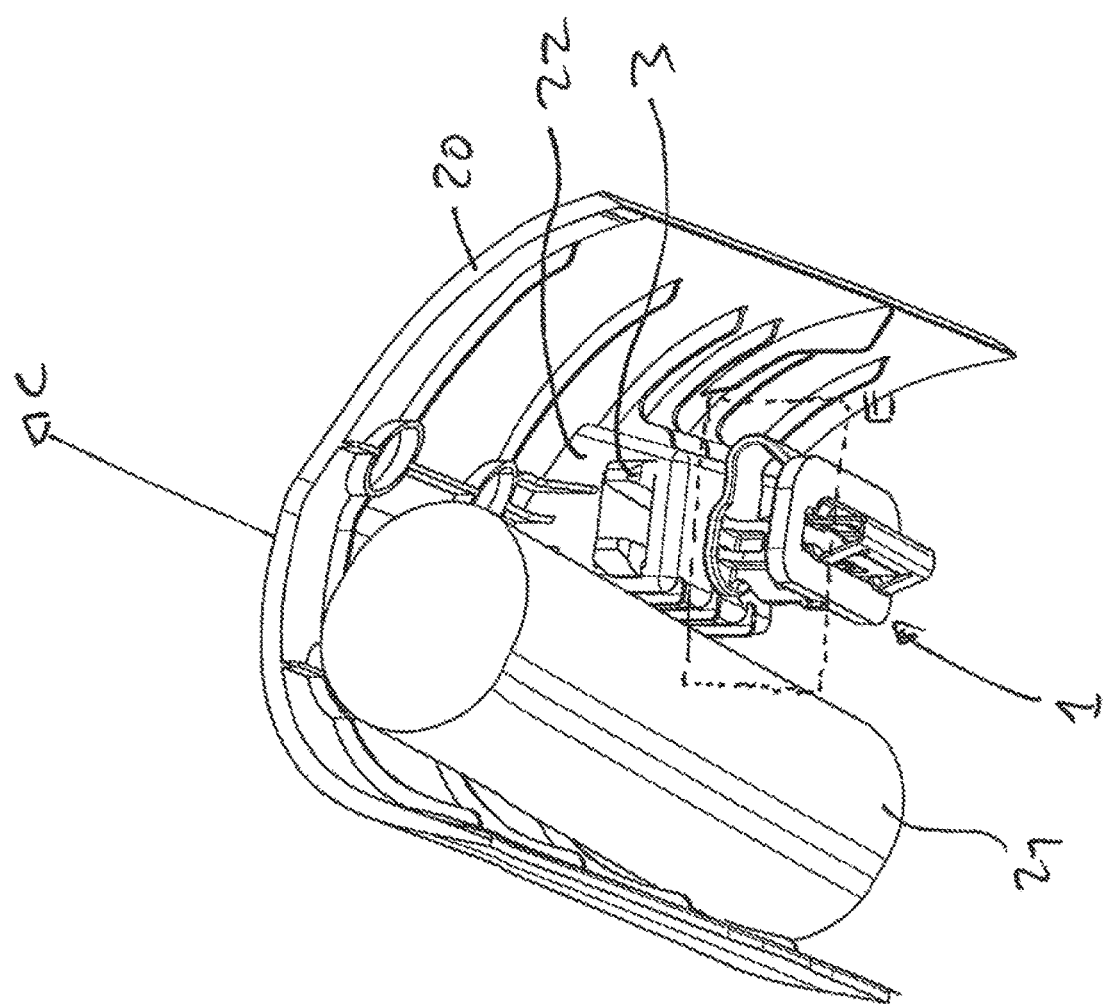
FIG. 4 a cover panel according to the invention with an airbag covered by the latter in a perspective view with the use of a fastener according to the invention on FIG. 3.

FIG. 4 shows the cover panel 20 according to the invention. The cover panel 20 exhibits a longitudinal extension in direction C, and is curved in design, so that it can cover an airbag 21 also depicted on FIG. 4, which is situated between the cover panel 20 and a structure (not shown on FIG. 4) of a vehicle. The airbag panel 20 exhibits a receptacle 22. The fastener 1 according to the invention is joined with the cover panel via this receptacle 22. This is accomplished by joining the second connector 3 with the cover panel 20. To this end, the second connector 3 is designed to reflect the geometry of the receptacle 22.

As also shown on FIG. 4, the restraining band 4 extends in a plane E that runs perpendicular to the longitudinal extension C of the cover panel 20.

Figure 5:
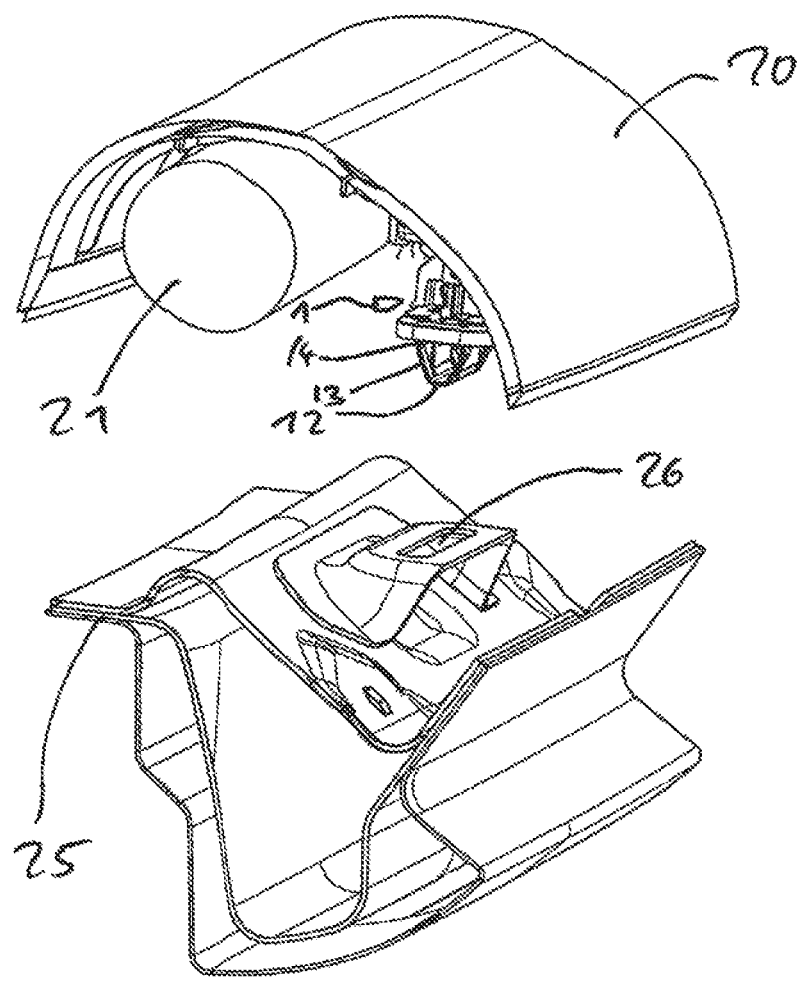
FIG. 5 a perspective view of a possible step for assembling the cover panel according to the invention with an airbag to the structure of a vehicle.

FIG. 5 shows how the cover panel 20 and airbag 21 are joined with the structure 25 of a vehicle, in particular with the A-pillar of a vehicle. This is accomplished by introducing the clip 12 of the first connector 2 into an opening 26 of the structure 25. The diameter or largest extension of the opening 26 is smaller than the diameter or largest extension of the clip 12 in the area where an inclined surface of the connecting element 13 transitions to the barb 14. As a result, while the clip 12 is inserted into the opening 26, the connecting elements 13 are initially compressed in a direction perpendicular to the insertion direction, and then snap outwardly back again after passing the opening. In this way, they block the fastener from being pulled out away from the structure 25.

Figure 6:
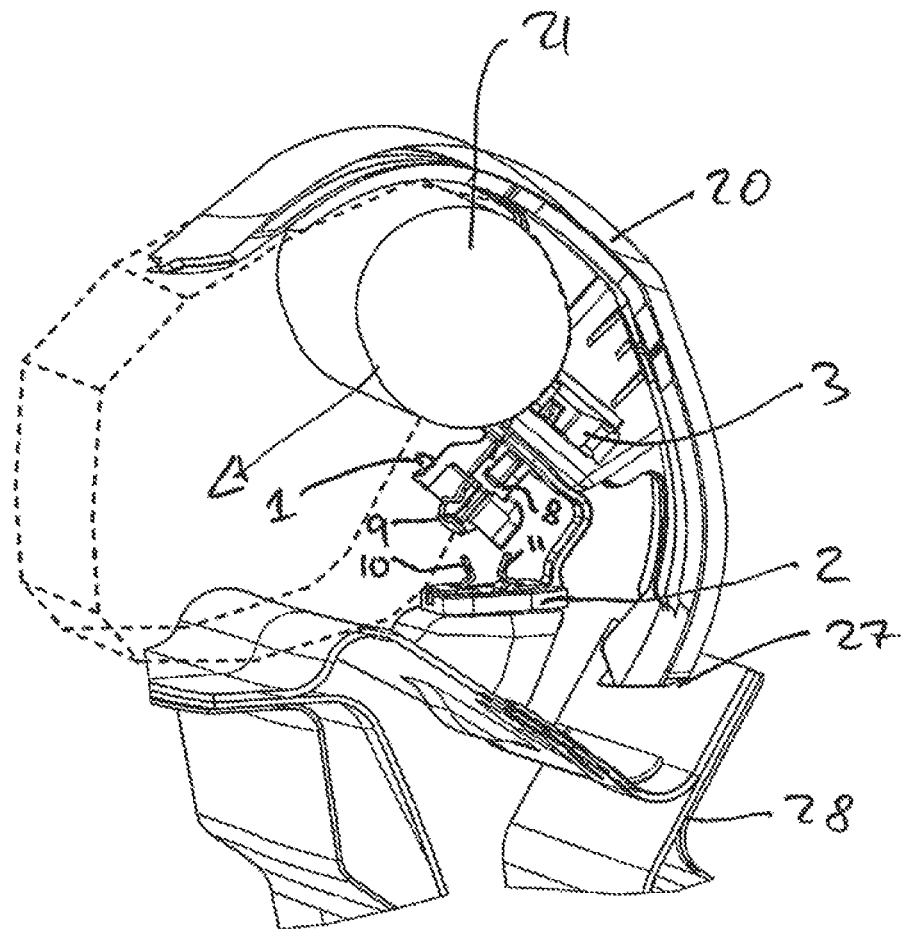
FIG. 6 the operating state once the fastening of the panel on the structure has been detached by virtue of the fastening between the spacer fixedly joined with the second connector having become detached from the first connector.
Figure 7:
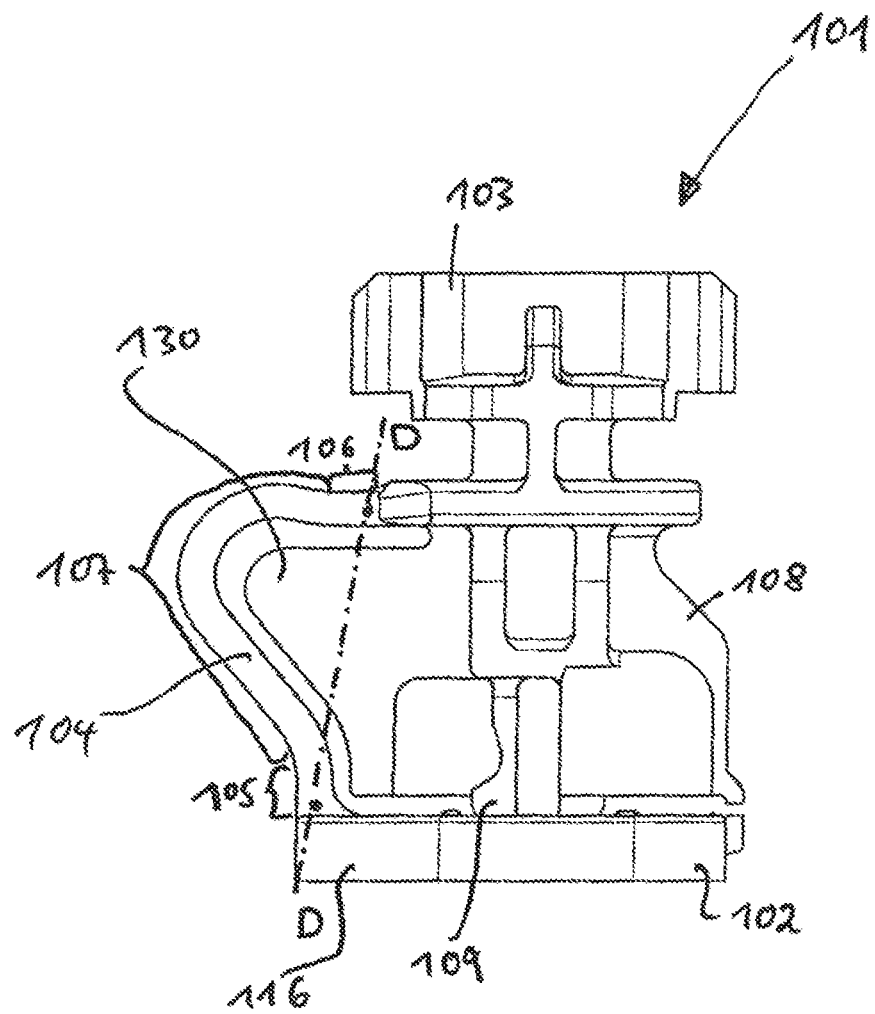
FIG. 7 a side view of a second embodiment of the fastener according to the invention in its normal operating state, without any illustration of the clip belonging to the first connector.

As shown on FIG. 6, when the airbag 21 is deployed, the cover panel 20 moves away from the structure due to the increase in volume of the airbag 21. As a result, the fastening between the spacer 8, and hence between the second connector 3, and the first connector 1 is detached. The head 9 is pulled out of the grasp of the clamps 10, 11. The restraining band 4 tightens in the process, and causes the second connector 3 to execute a swiveling movement relative to the first connector 2 around the contact between an edge 27 of the cover panel 20 and a surface of an extension 28 of the shoulder 25.

FIGS. 7, 8, 9 and 10 describe a second embodiment that slightly differs from the first embodiment depicted on FIGS. 1 to 6. Apart from geometric changes in the cross sectional surface of the spacer 8 and in the type of design for the connecting elements of the second connector 3 for joining with a receptacle 22 of the cover panel, the embodiment shown on FIGS. 7 to 10 differs from the embodiment shown on FIGS. 1 to 6 in particular in that the spacer 108 exhibits a projection, which in the normal operating state of the fastener 101 protrudes into the space inside the bent portion 107 of the restraining band 104. In the description of the second embodiment depicted on FIG. 7 to 10, the reference numbers comparable to the first embodiment were increased by a value of 100. For purposes of simplification, only the differences from the first embodiment are described.

As evident from the second embodiment, the first end 105 also extends along a straight line. In like manner, the second end 106 of the restraining band 104 extends along a straight line. As in the first embodiment, the bent portion 107 is designed like a kind of loop.

The spacer 108 exhibits a projection 130 that protrudes into the space inside the bent portion 107 of the restraining band 104. In so doing, the projection 130 does not contact the restraining band 104 in the normal operating state (see FIG. 7) of the fastener 101. In the normal operating state of the fastener 101, a gap is provided between the projection 130 and bent portion 107 of the restraining band 104. As evident on FIG. 7, the restraining band is completely situated on one side of a line D-D, which joins the point of transition of the first end 106 of the fastening 104 to the base body 116 and the contact point of the second end 106 of the fastening band with the second connector 103. The spacer 108 is mainly (except for a negligible portion of the connecting element of the second connector 103 with the receptacle of the cover panel) arranged on the opposite side of the line D-D. Only the projection 130 crosses the line D-D, and protrudes into the side of the line allocated to the restraining band 104.

Figure 8:
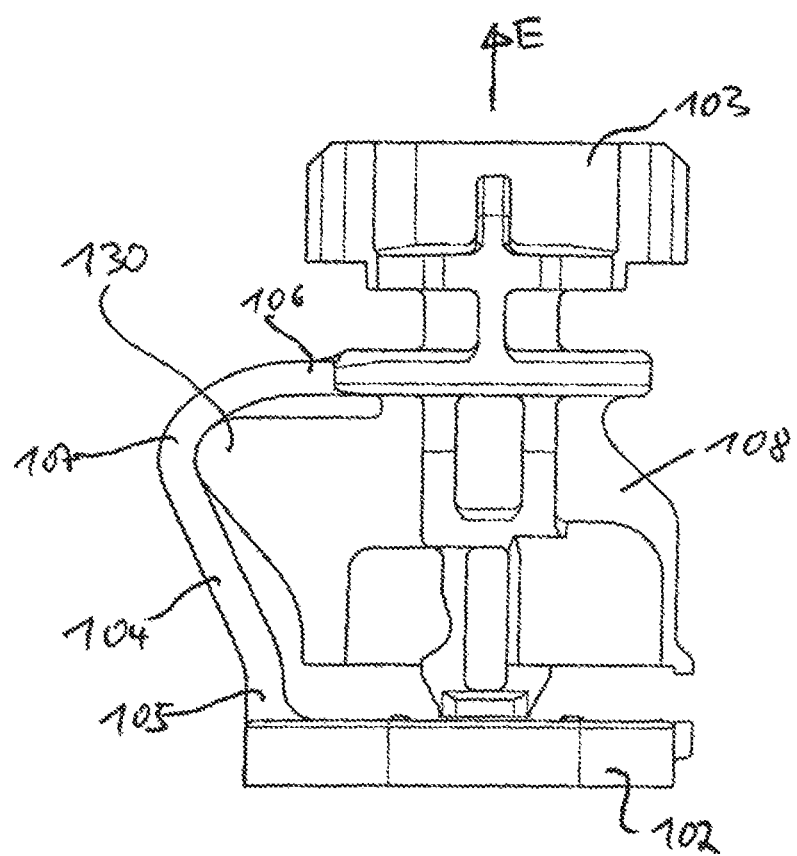
FIG. 8 the side view according to FIG. 7, wherein the second embodiment of the fastener is in a state where the connection between the panel and structure was detached, and the second connector moves linearly away from the first connector.
Figure 9:
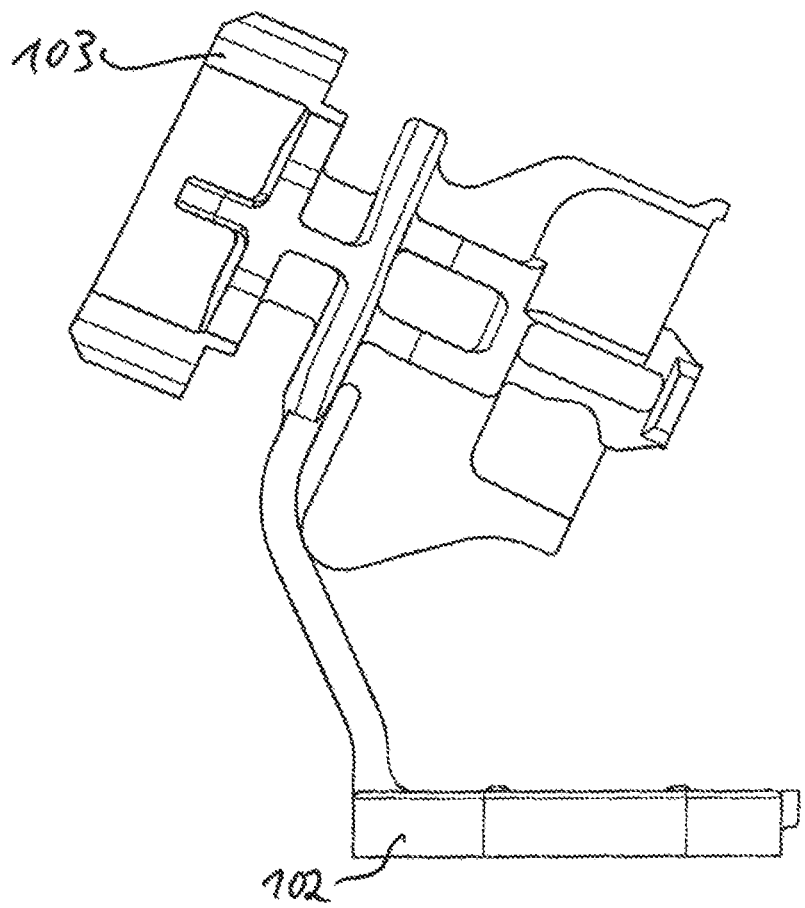
FIG. 9 the side view according to FIG. 8, in an operating state where the second connector has moved so far away from the first connector that the projection of the spacer in contact with the restraining band causes the second connector to swivel relative to the first connector.

As shown on FIG. 8, when the second connector 103 is moved linearly from the first connector 102 in the direction of the arrow E, thereby detaching the fastening between the head 109 and (not depicted on FIG. 8) clamps 110, 111 of the clip 112, the restraining band 104 is increasingly tensioned, and the projection 130 comes into contact with the restraining band 104. As illustrated on FIG. 9, this generates a pivot, around which the second connector 103 swivels relative to the first connector 102. This changes an initially linear movement of the second connector 103 relative to the first connector 102 into a swiveling movement. This makes it possible to control the movement of the second connector 103, and hence of the panel joined thereto, relative to a first connector 102 and structure joined thereto.

Figure 10:
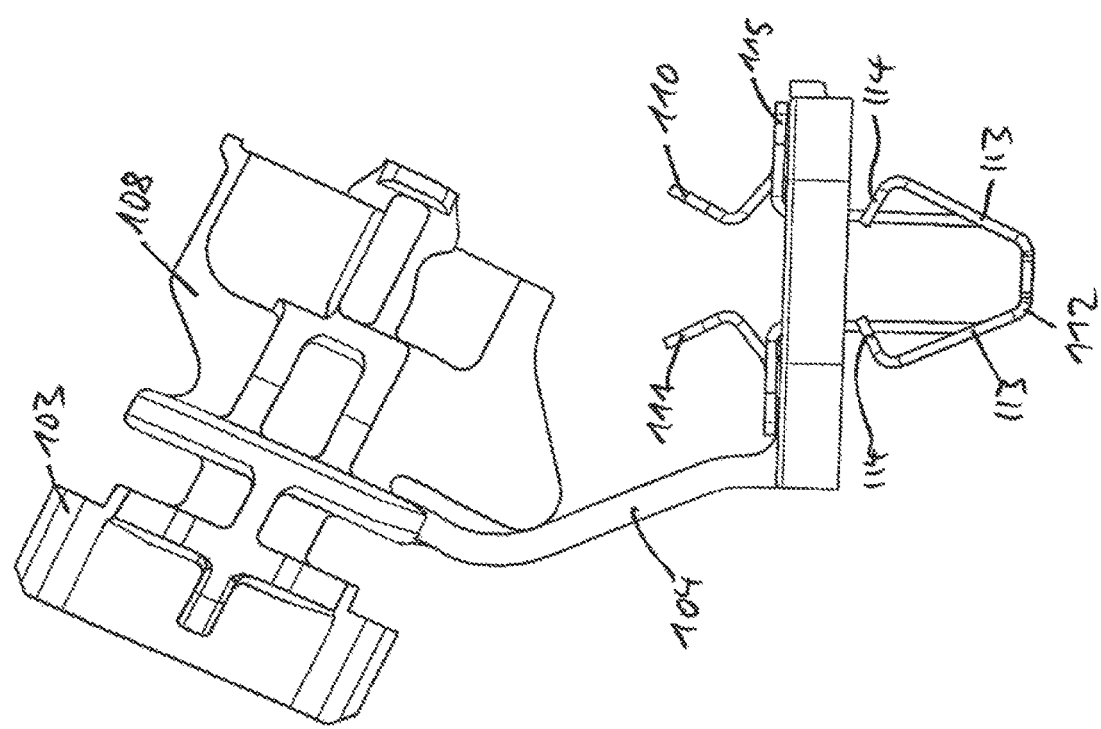
FIG. 10 the view according to FIG. 9, for the sake of completeness with the clip belonging to the first connector.

For the sake of completeness, FIG. 10 shows that the first connector 102 exhibits a clip 112 comparable to the clip 12 depicted on FIG. 2.

Figure 11:
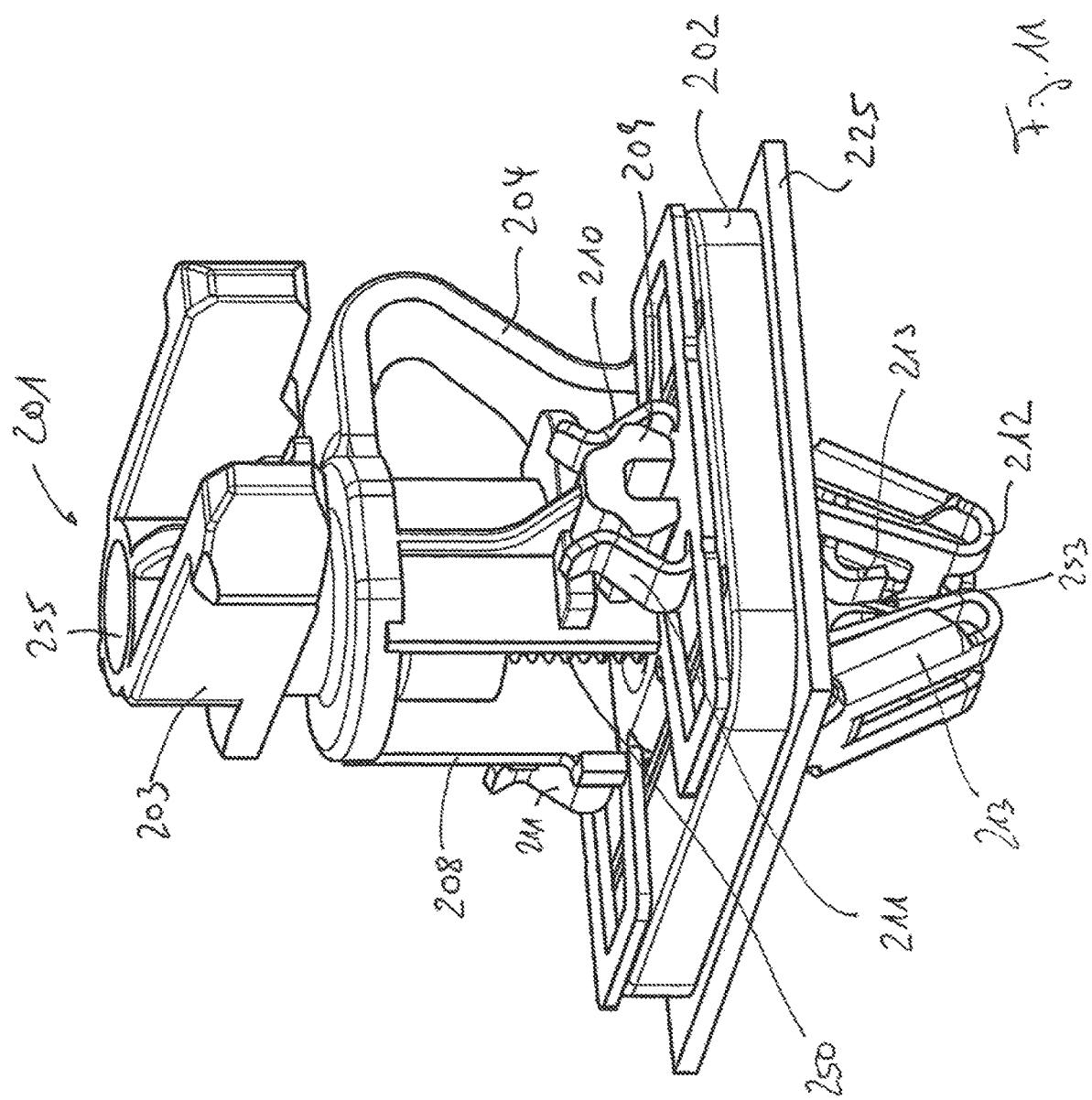
FIG. 11 another embodiment of the fastener according to the invention in a perspective view, with the clip of the first connector and an insertion element.
Figure 12:
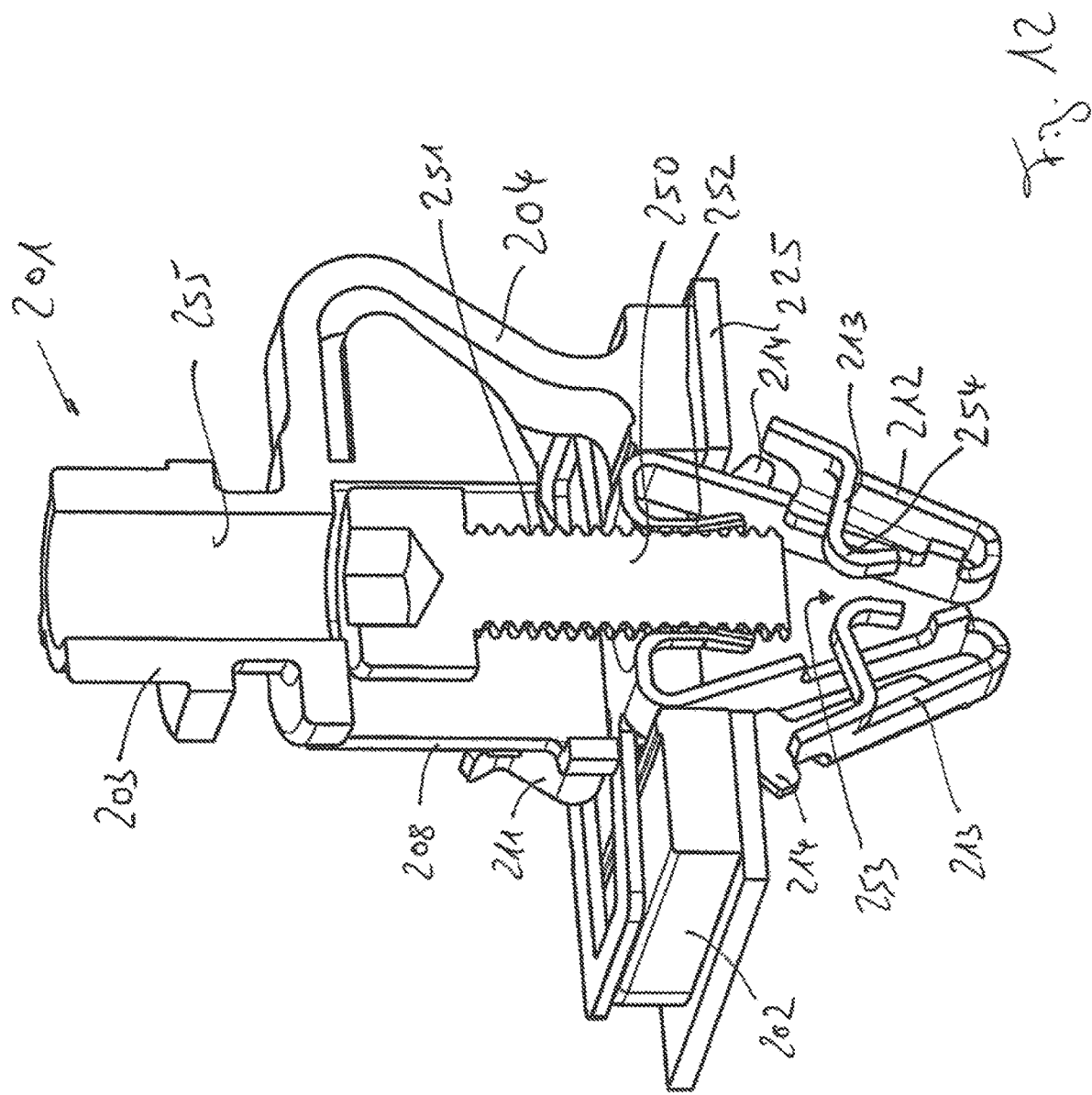
FIG. 12 a partially cut depiction of FIG. 11.
Figure 13:
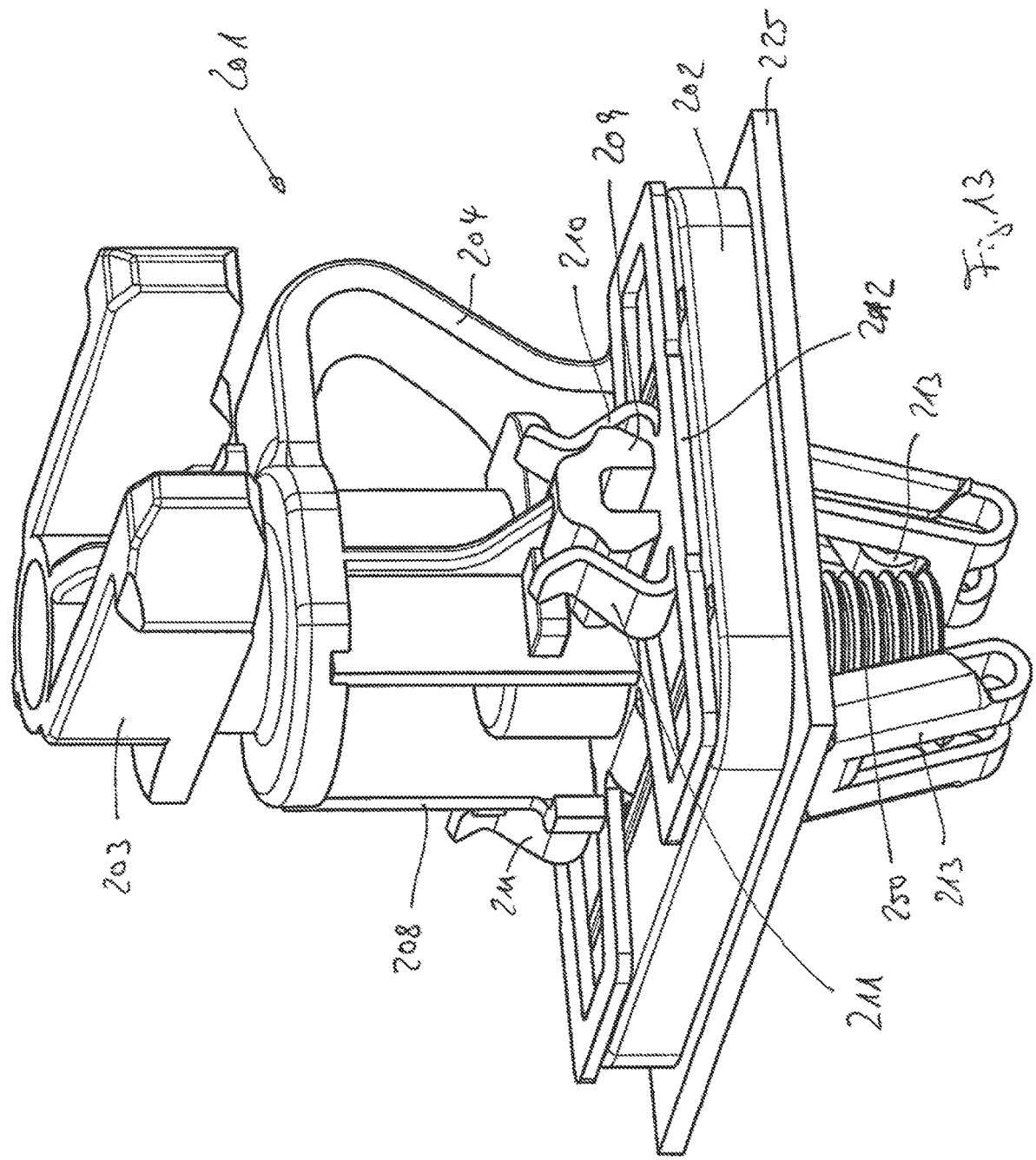
FIG. 13 the embodiment according to FIG. 11 in a perspective view, with the insertion element introduced into the clip.

FIG. 11, 12, 13, 14, 15, 16 describe additional embodiments that differ from the two embodiments shown on FIGS. 1 to 10. Apart from geometric changes in the cross sectional surface of the spacer and in the type of design for the connecting elements of the second connector for joining with a receptacle of the cover panel, the embodiment shown on FIGS. 11 to 16 differs from the embodiments shown on FIGS. 1 to 10 in particular in that an insertion element 250 is present, which together with the fastener 201 yields a system that can be used to determine whether the barbs 214 are engaging behind the structure 225. The insertion element 250 enables a "proof of installation". If the insertion element 250 can be inserted into a channel 253 formed on the clip 212, the distance of the barbs 214 is such that the structure 225 is engaged form behind. In the description of the additional embodiments depicted on FIGS. 11 to 16, the reference numbers comparable to the first embodiments are increased by the value 100 or 200.

For purposes of simplification, only the differences from the first two embodiments are described.

The insertion element 250 is designed as a helical element having a shank section and a head section. The shank section exhibits a thread 251. The insertion element 250 is held in a mount 252, which encompasses two arms that are designed to abut against the insertion element 250 and formed on the clip 212. The clip 212 exhibits a channel 253, whose inner contour can be varied as a function of the distance between two barbs 214. The inner contour is determined by the connecting elements 213 joined with the barbs 214. In the edge area, the channel 253 exhibits projections provided on the connecting elements 213. In the position of the fastener 201 shown on FIG. 12, the barbs 214 do not yet engage completely behind the structure 225, so that the insertion element 250 cannot be inserted into the channel 253. The outer contour of the insertion element 250 is essentially adjusted to the inner contour of the channel 253, specifically provided that the inner contour 253 is such that the distance present between the barbs 214 allows the barbs 214 to engage behind the structure 225.

The connecting elements 213 or projections of the connecting elements 213, which are edge areas of the channel, have formed on them threaded sections 254, which can come to engage the insertion element 250.

Figure 14:
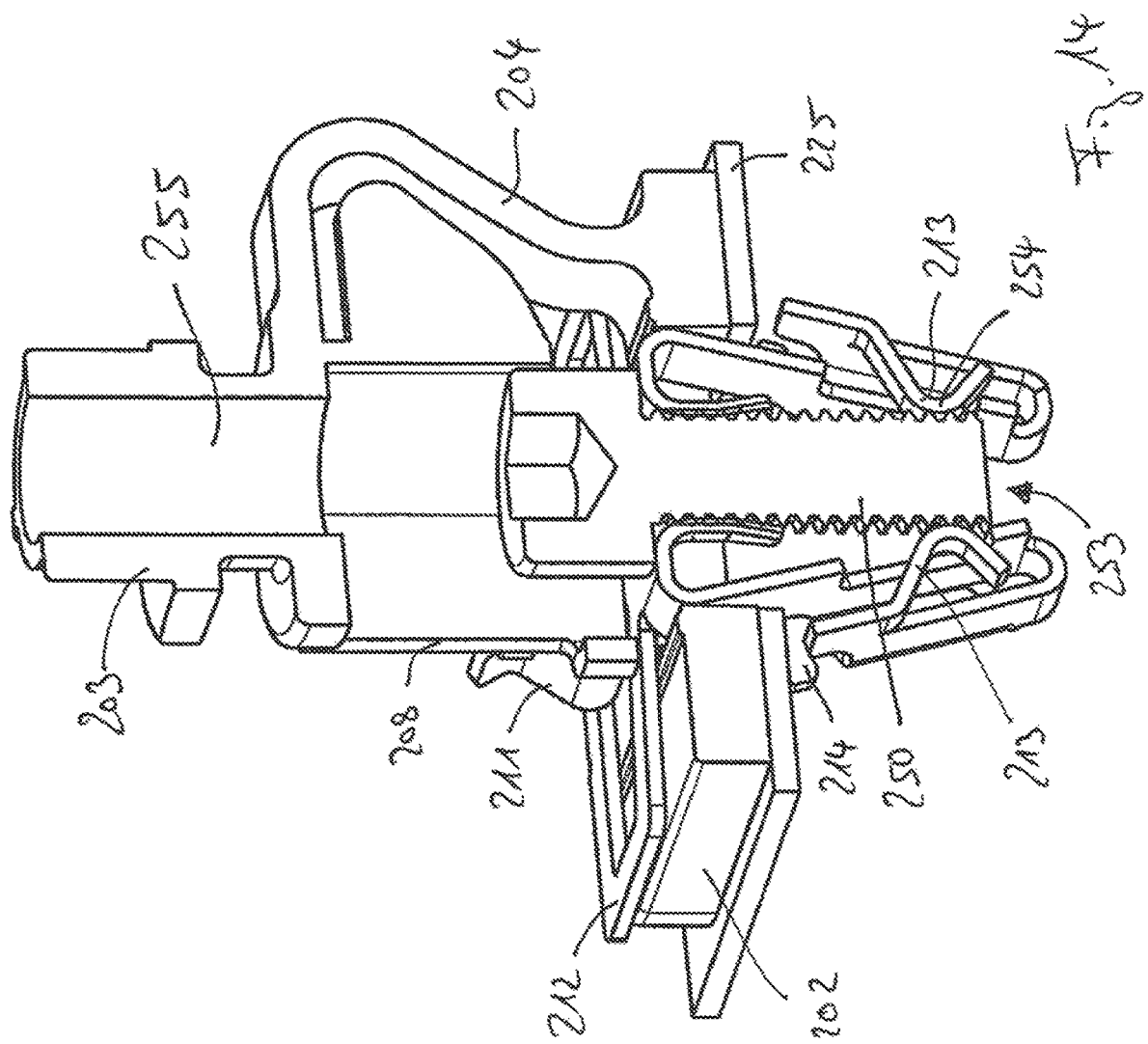
FIG. 14 a partially cut depiction of FIG. 13.
Figure 15:
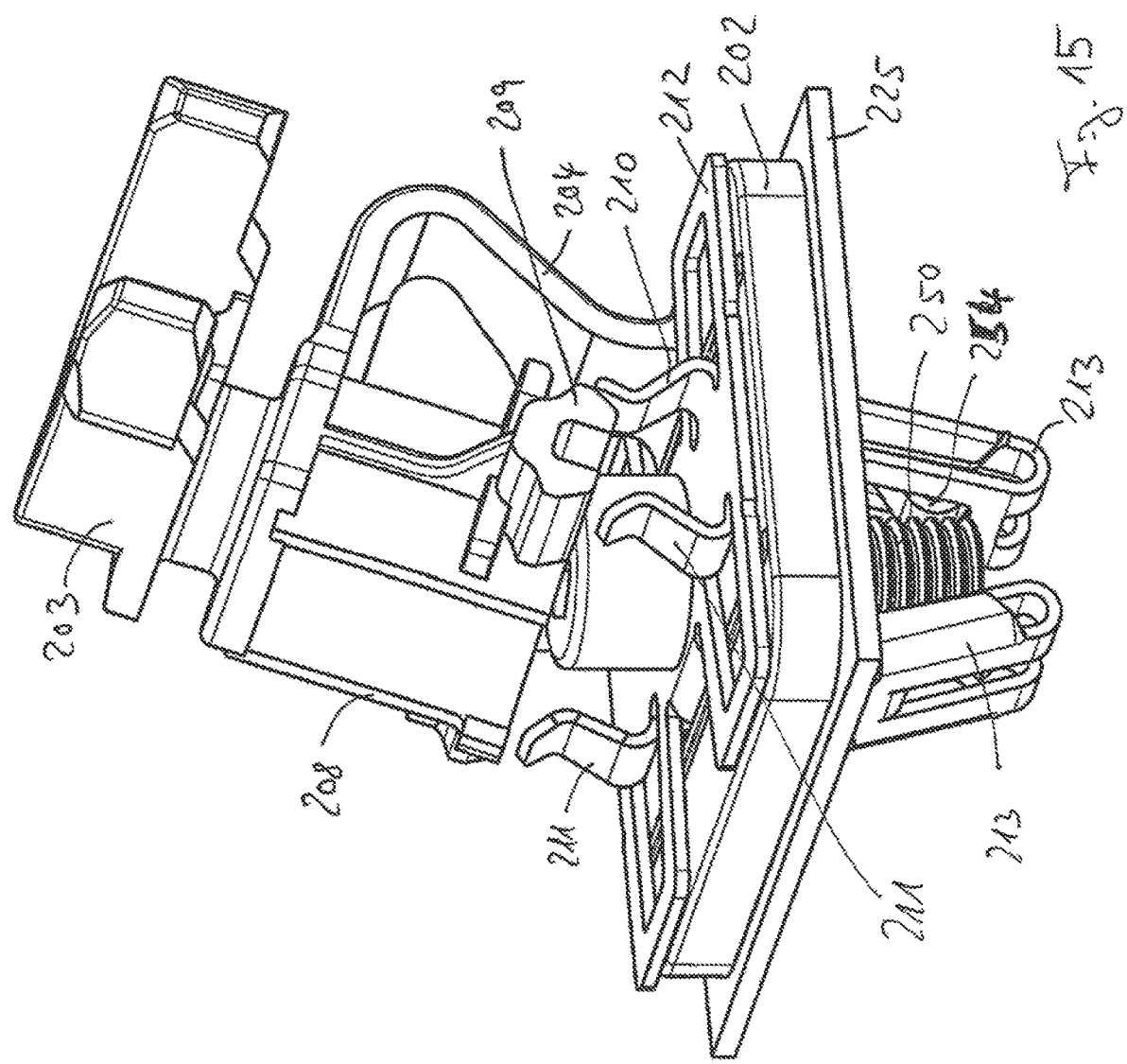
FIG. 15 the embodiment on FIG. 11 in a perspective view, with the fastening band bent back and insertion element introduced.
Figure 16:
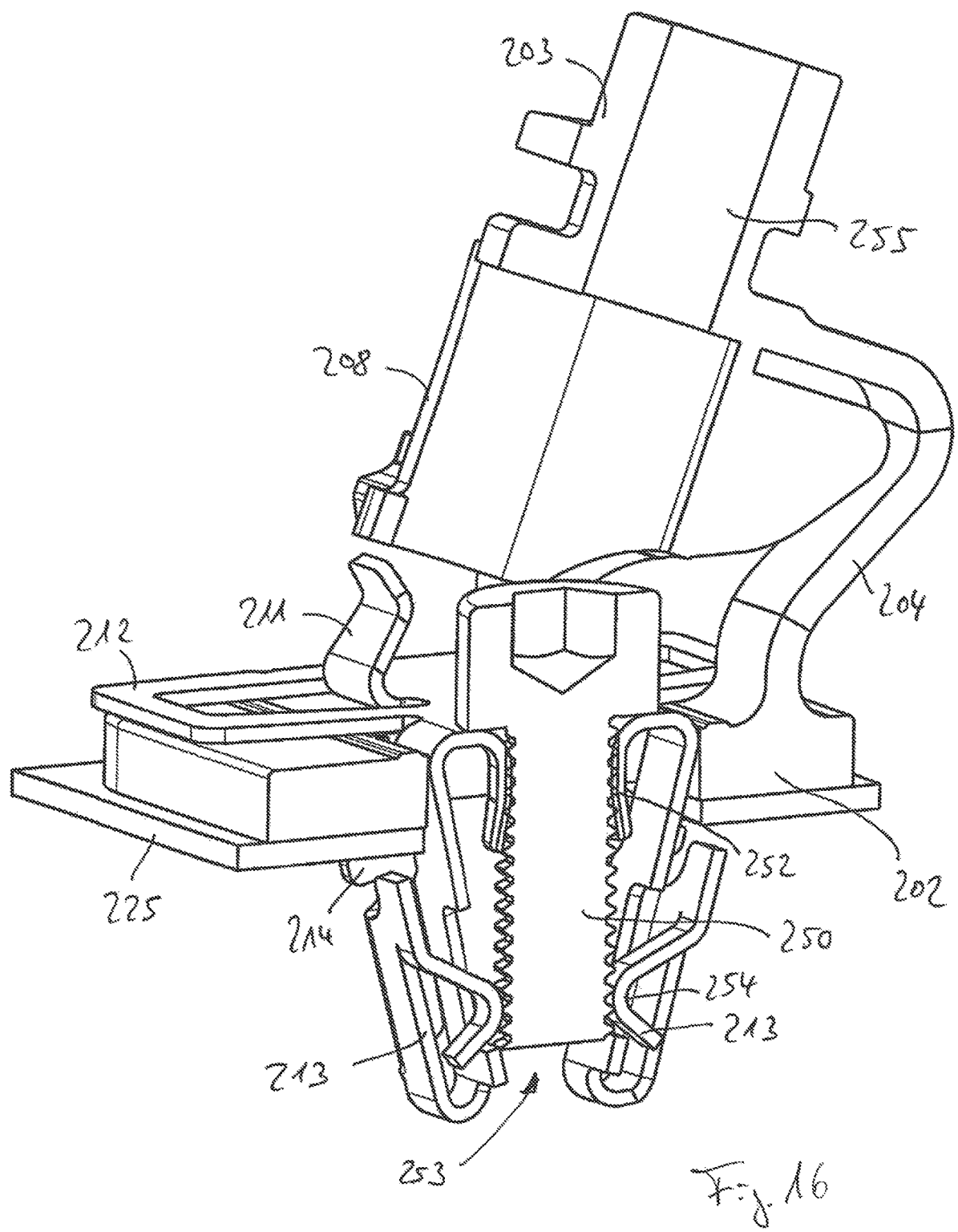
FIG. 16 a partially cut depiction of FIG. 15.

As shown on FIG. 14, the insertion element 250 can be inserted into the channel 253 when the connecting elements 213 of the two opposing barbs 214 are spaced apart by a predetermined distance that allows the allocated barbs 214 to engage behind the structure 225.

The length of the insertion element 250 is dimensioned in such a way that the insertion element 250 can be held in the mount, and the head 209 can here be held by the two clamps 210, 211. In the additional embodiments depicted on FIGS. 11 to 16, an access opening 255 is formed in the second connector 203, with which the insertion element 250 can be accessed even if the head 209 is held by the two clamps 210, 211. The access opening 255 is centrally located over the channel 253 when the head 209 is held by the clamps 210, 211.

Figure 17:
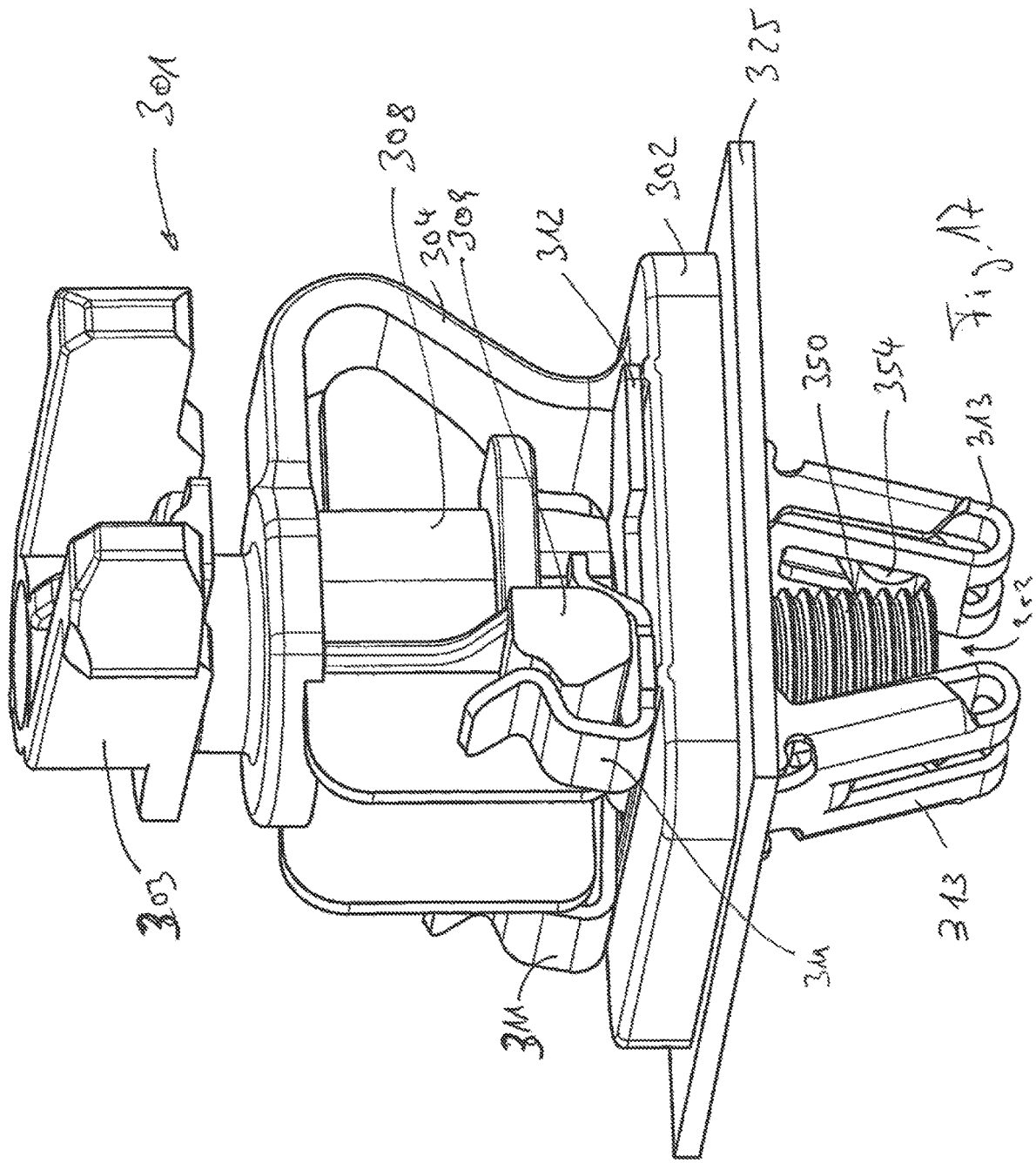
FIG. 17 another embodiment of the fastener according to the invention in a perspective view with insertion element.
Figure 18:
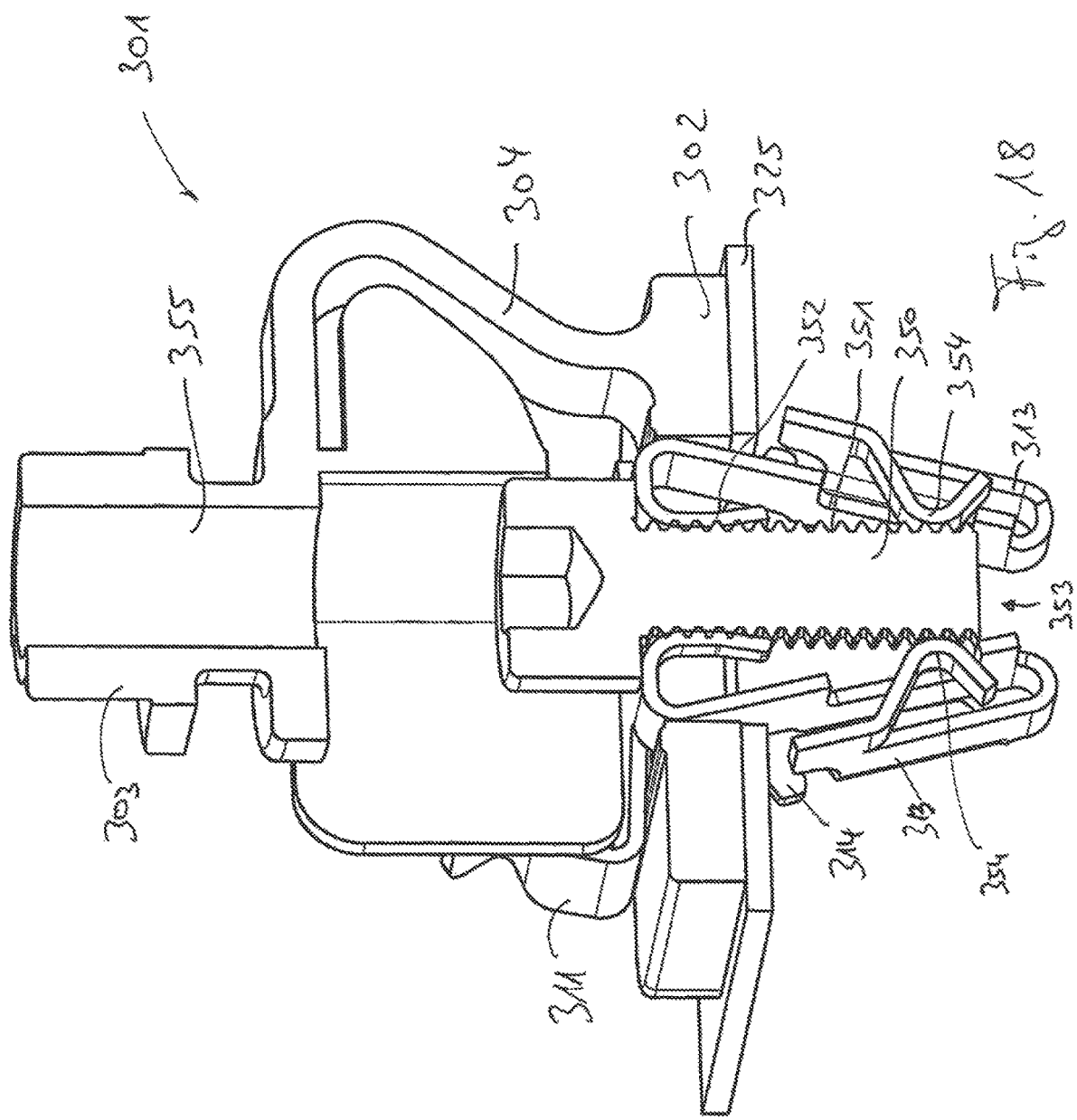
FIG. 18 a partially cut depiction of FIG. 17.
Figure 19:
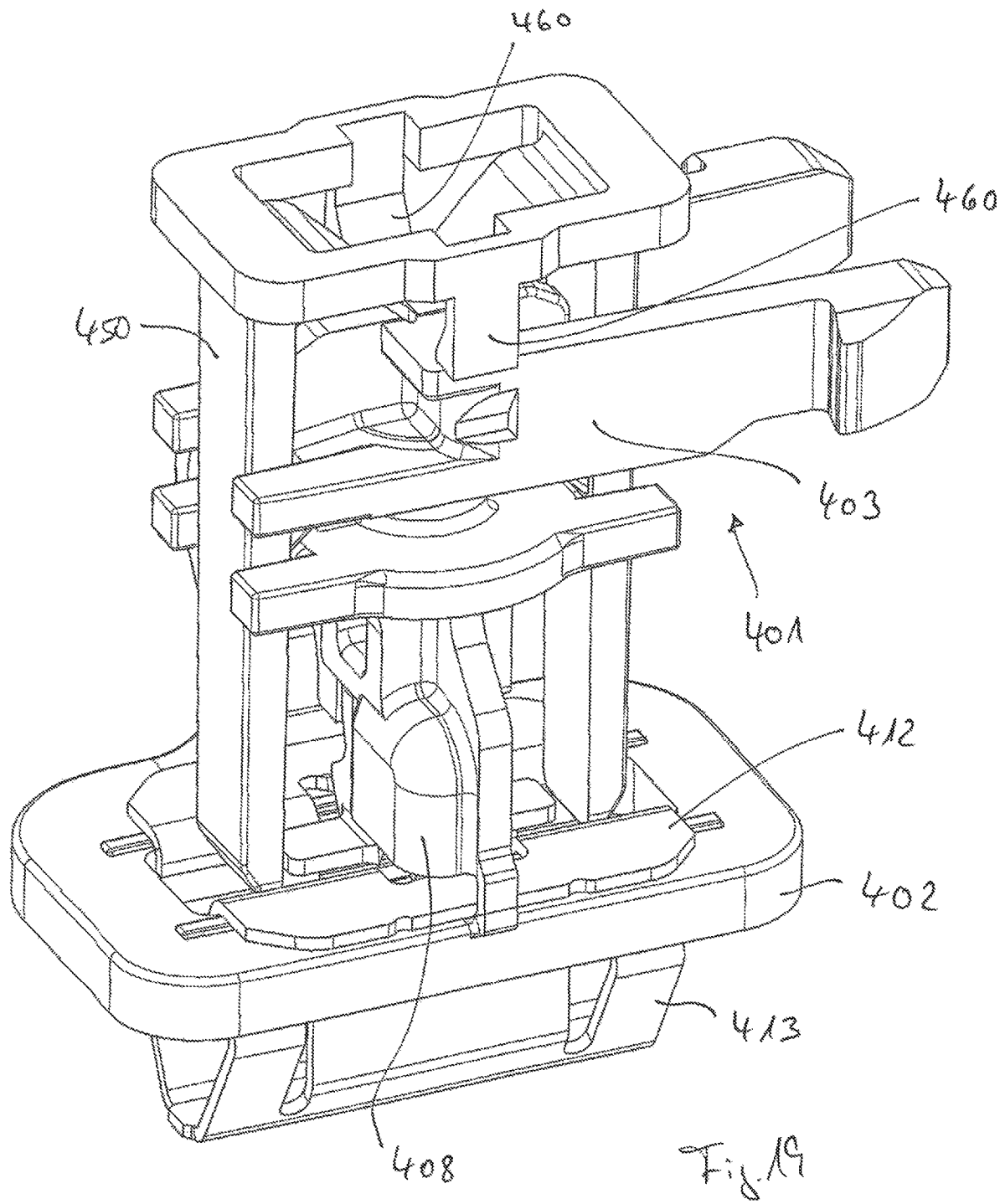
FIG. 19 another embodiment of the fastener according to the invention in a perspective view with an insertion element in an uninstalled state.
Figure 20:
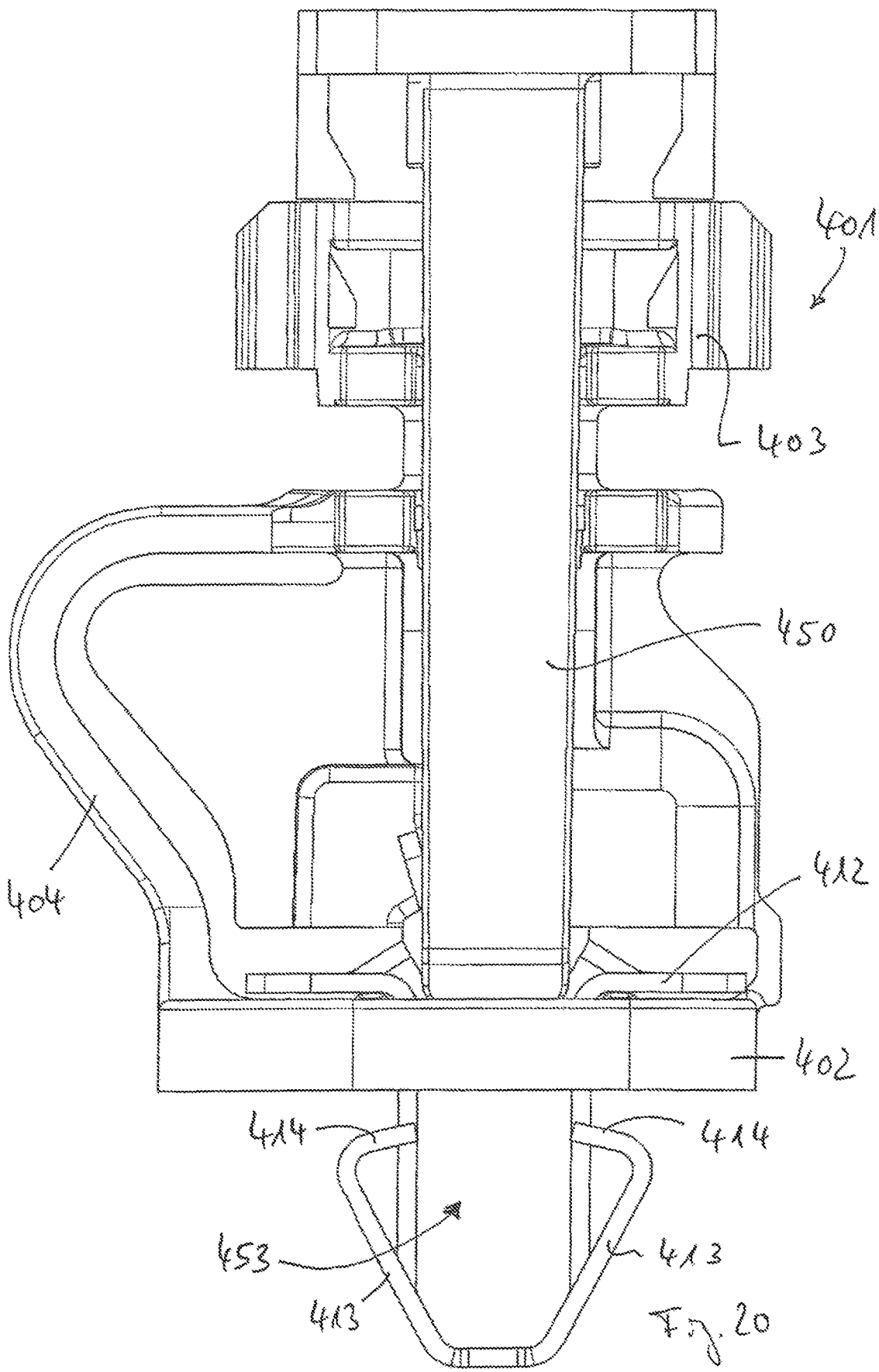
FIG. 20 the embodiment according to FIG. 19 in a partially cut depiction from the side.

FIGS. 17 and 18 describe another embodiment that slightly differs from the additional embodiment shown on FIGS. 11 to 16. Apart from the varying configuration of the spacer 208, the embodiment shown on FIGS. 17 and 18 differs from the embodiment shown on FIGS. 11 to 16 in particular in that the head 309 is held by only one clamp 311. In the description of the embodiment depicted on FIGS. 17 and 18, the reference numbers comparable to the embodiment on FIGS. 11 to 16 were increased by the value of 100. For purposes of simplification, only the differences from the first embodiment are described.

The first connector 302 exhibits a clip 312, which holds the head 309 of the spacer 8 by means of a clamp 211.

FIGS. 19, 20, 21 and 22 describe another embodiment that differs from the embodiment shown on FIGS. 11 to 16, which essentially exhibits an insertion element 450 with a different design by comparison to the embodiment shown on FIGS. 11 to 16. In the description of the additional embodiment shown on FIGS. 19 to 22, the reference numbers comparable to the embodiment shown on FIGS. 11 to 16 were increased by the value of 200. For purposes of simplification, only the essential differences are described.

Two channels 453 are present, into which a respective pin of an insertion element 450 can be inserted. The insertion element 450 is designed as a plug element, and can only be inserted into the channels 453 if the barbs do not engage behind the structure depicted on FIGS. 19 to 22. The insertion element 450 is provided with a latch, which can interact with a detent formed on the second connector 403. The latch on the insertion element 450 exhibits two latching lugs 460. The detent on the second connector 403 exhibits a latching groove 461 for each latching lug 460.

Figure 21:
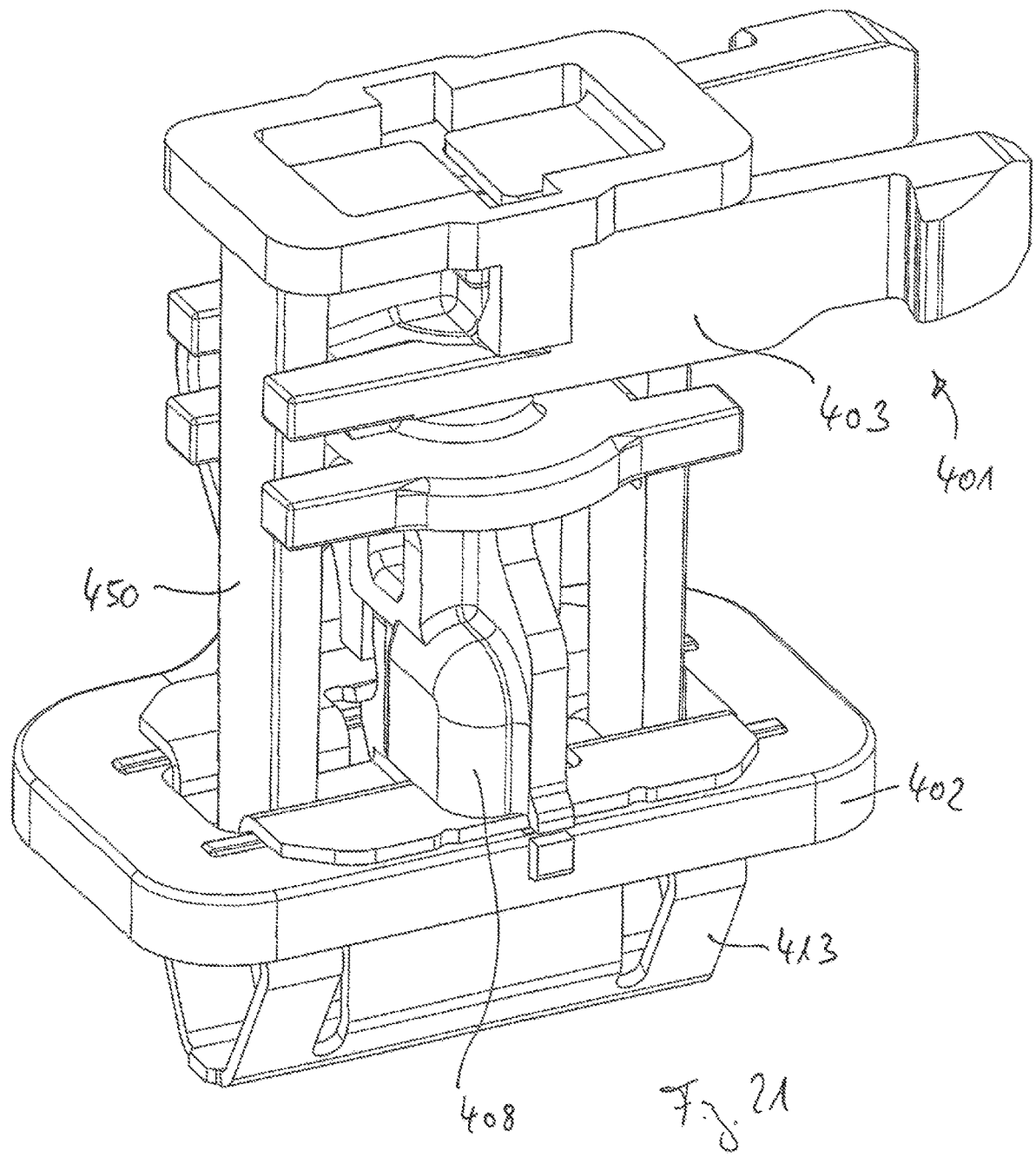
FIG. 21 the embodiment according to FIG. 19 in a perspective view in an installed state.
Figure 22:
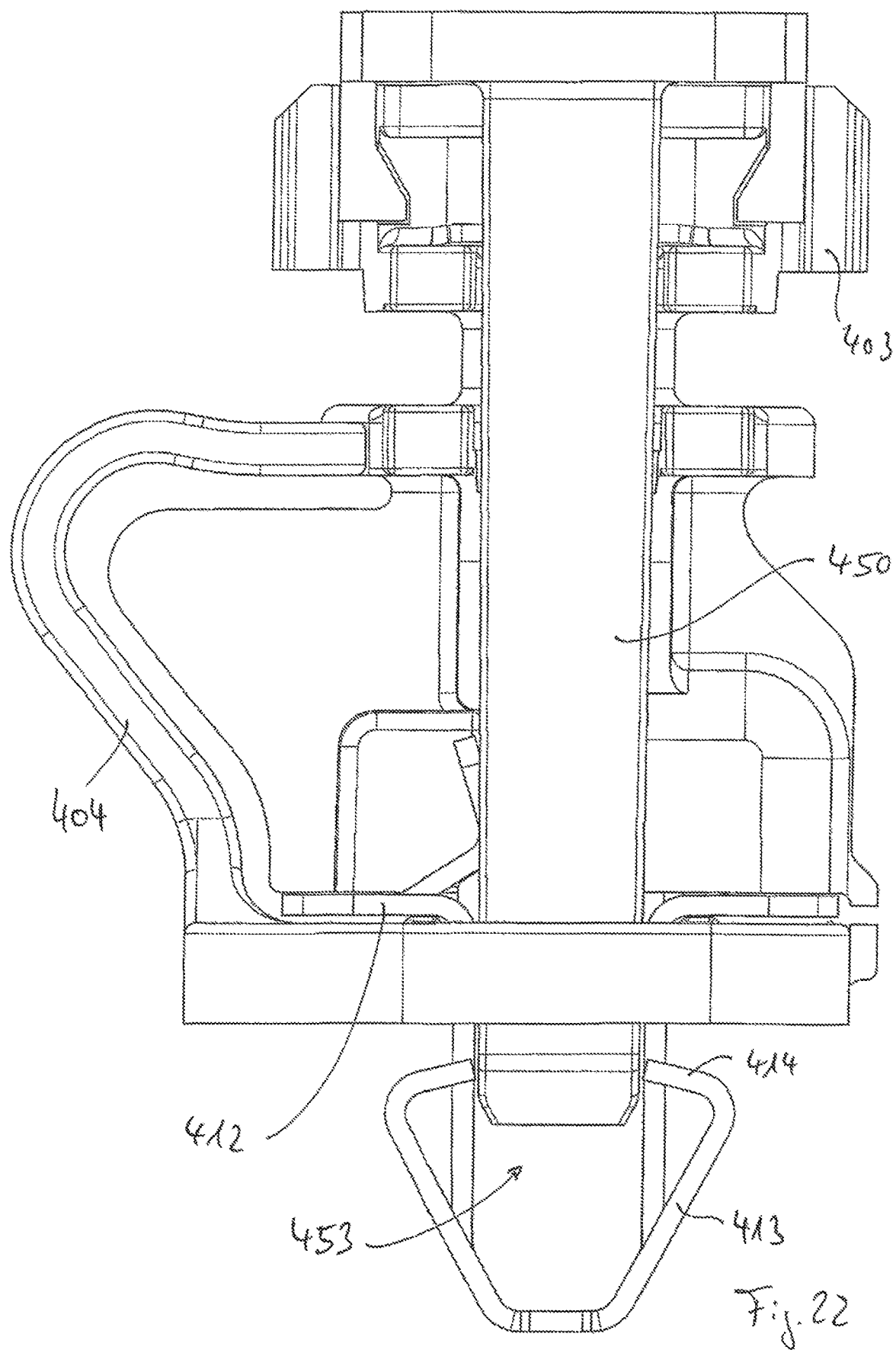
FIG. 22 the embodiment according to FIG. 19 in a partially cut depiction from the side in an installed state.

The proof of installation is presented on FIGS. 21 and 22. The insertion element 450 can plunge into the channel 453, and the insertion element 450 becomes latched in this position.

Figure 23:
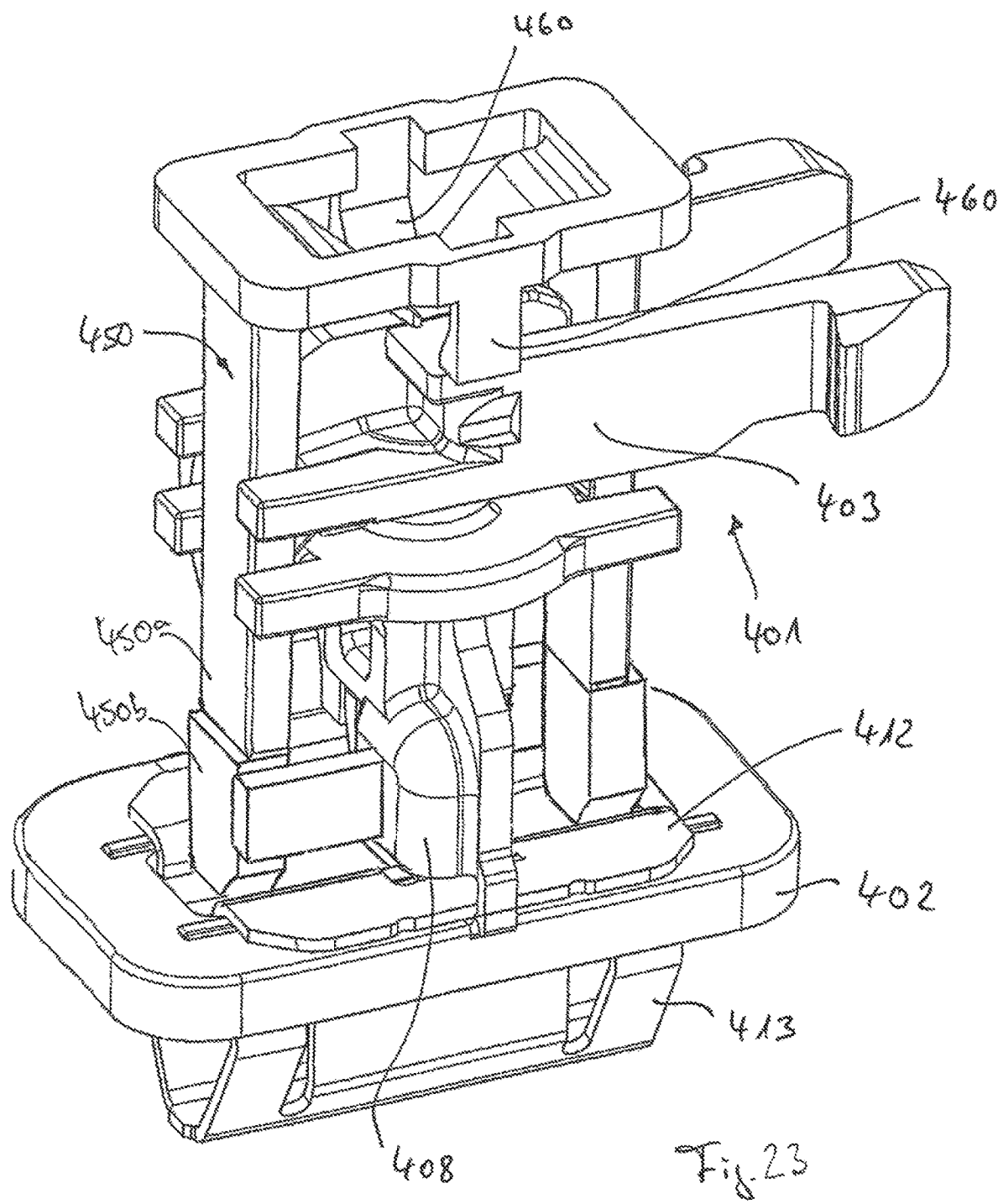
FIG. 23 another embodiment of the fastener according to the invention in a perspective view with an insertion element in an uninstalled state.
Figure 24:
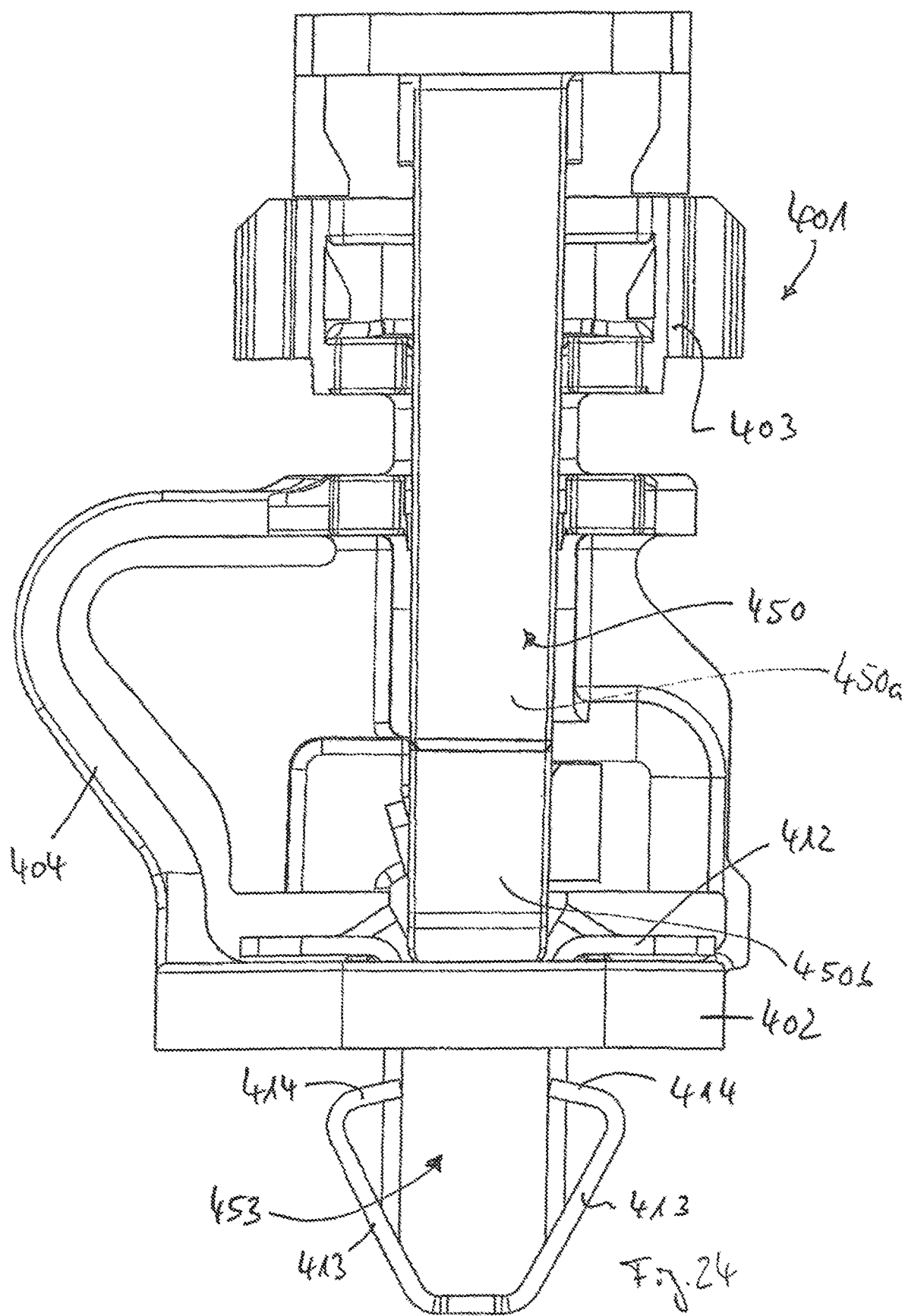
FIG. 24 the embodiment according to FIG. 23 in a partially cut depiction from the side.
Figure 25:
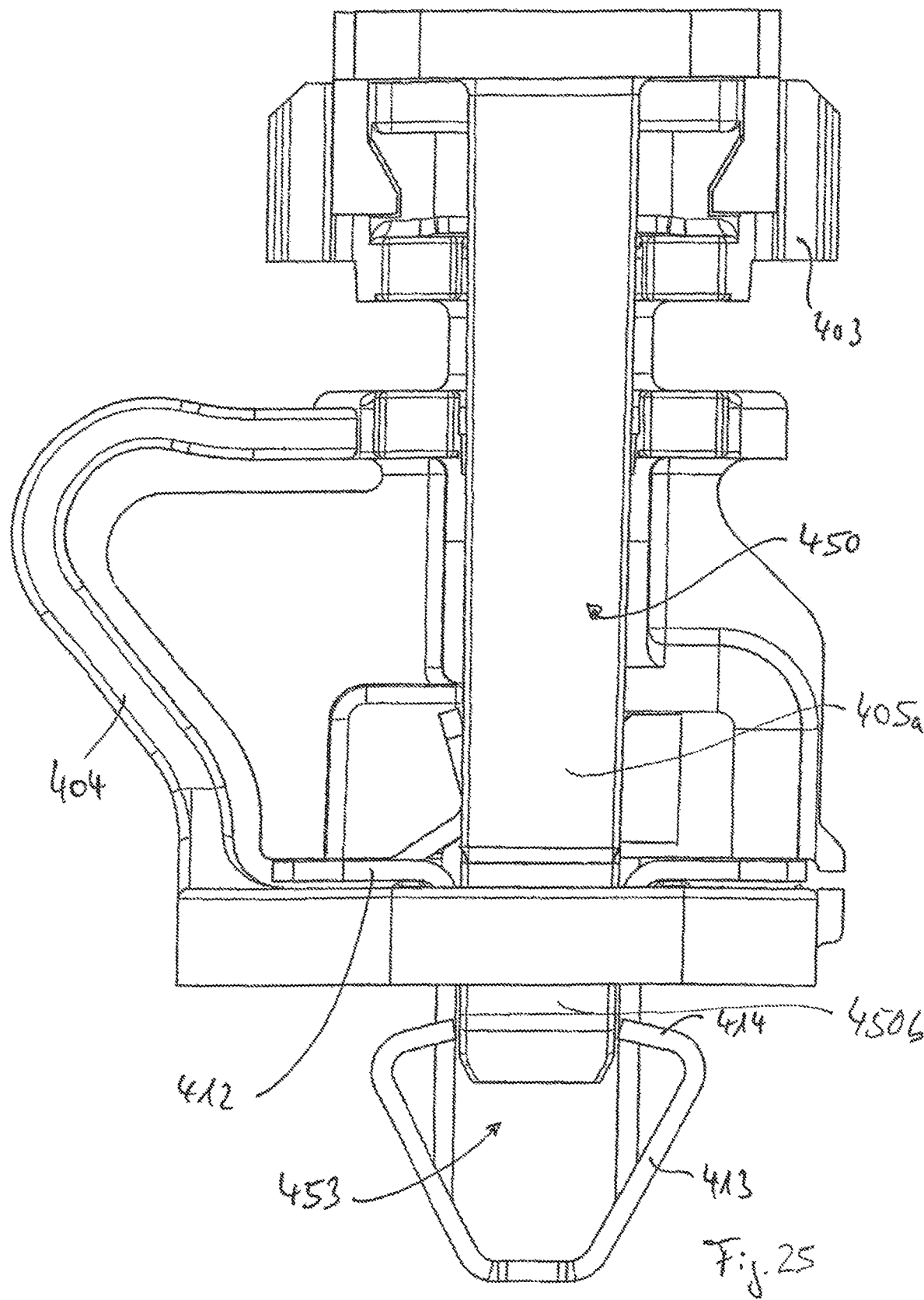
FIG. 25 the embodiment according to FIG. 23 in a partially cut depiction from the side in an installed state.

FIGS. 23, 24 and 25 describe another embodiment that differs from the embodiment shown on FIGS. 19 to 22. The significant difference in the embodiment depicted on FIGS. 23 to 25 lies in the multipart configuration of the insertion element 450. The insertion element 450 designed as a plug element exhibits two parts, which are designed as translationally movable parts 450a, 450b or plungers. The individual parts of the insertion element 450 are guided by means of guiding elements. The two parts 450a, 450b are held in the effective direction relative to each other, so that the part 450a introduces the element 450b into the channel in the longitudinal direction toward the movement of the insertion element 450. Only once the channel is free, i.e., the barbs engage behind the structure, can the element 450b be inserted into the channel. The insertion element 450 is held in position by the elements 460 latching the insertion element 450, thereby also preventing the barbs from detaching from the structure.

Figure 26:
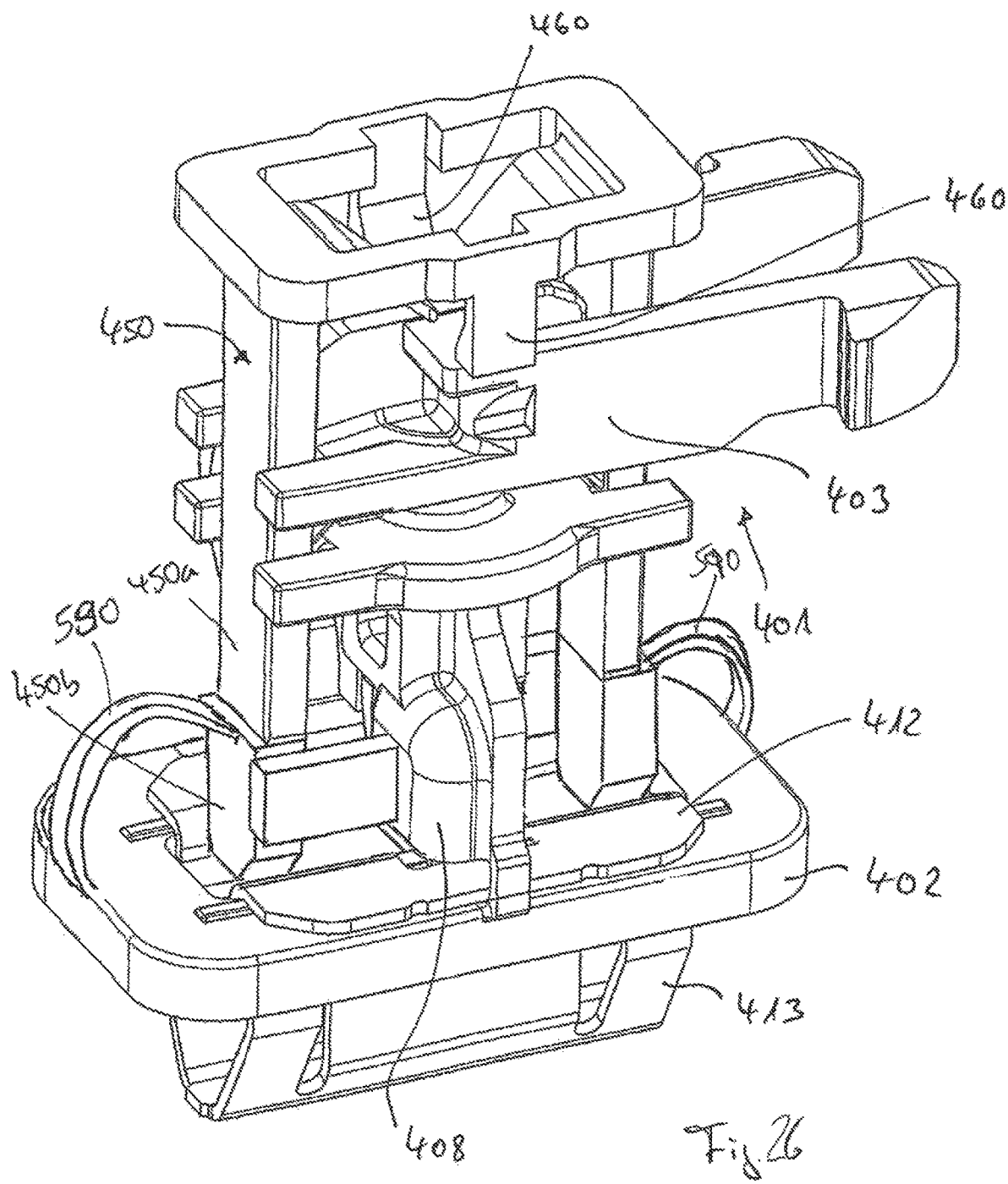
FIG. 26 another embodiment of the fastener according to the invention in a perspective view with an insertion element in an uninstalled state.

FIG. 26 describes another embodiment that differs from the embodiment shown on FIGS. 23 to 25, wherein the difference from the embodiment depicted on FIGS. 23 to 25 lies in the fact that the part 450b of the insertion element 450 is joined with the first connector 402 by means of an attachment 590. The part 450b of the insertion element 450 is gated onto the connector 402 by means of the attachment 590. The attachment 590 is bent from the outside inward in such a way that the attachment 590 exerts a tension like a spring, so that the attachment 590 tries to return to the initial position (for example, the gating state).

The invention claimed is:

1. A fastener for detachably joining a panel to a structure, the fastener comprising:
    a first connector for joining the fastener with the structure,
    a second connector for joining the fastener with the panel, wherein the second connector is detachably fastened to the first connector in the normal operating state of the fastener, and
    a restraining band having a first end and a second end, the first end joined with the first connector, and the second end joined with the second connector, wherein at least a portion of the restraining band exhibits a bent shape in a normal operating state of the fastener and wherein the bent shape defines a space,
    wherein a spacer is situated between the first connector and second connector, the spacer comprises a projection, and the projection protrudes into the space inside the portion of the restraining band in the normal operating state of the fastener.

2. The fastener according to claim 1, wherein the spacer is a cube or a cylinder or a support shaped other than a cube or cylinder.

3. The fastener according to claim 1, wherein the projection exhibits a surface facing away from the first connector in the normal operating state of the fastener and a gap is provided between the surface facing away from the first connector and a surface of the restraining band facing the surface facing away from the first connector.

4. The fastener according to claim 1, wherein the first end of the restraining band essentially extends in a first direction in the normal operating state of the fastener, and the second end of the restraining band essentially extends in a second direction in the normal operating state of the fastener, and wherein the first direction does not run parallel to the second direction, the first direction and the second direction define an included angle therebetween, and the included angle is greater than 5°.

5. The fastener according to claim 1, wherein the spacer extends along a longitudinal direction, and the ratio (LP/LR) between a longitudinal extension (LP) of the spacer in the direction of the longitudinal direction and a length of the restraining band (LR) is defined by the following formula: 1<LP/LR<2.

6. The fastener according to claim 1, wherein the first connector has a clip suitable for joining with the structure.

7. The fastener according to claim 6, wherein the clip exhibits an access opening, which permits access to connecting elements joined with barbs of the clip.

8. A system comprising a fastener according to claim 6 and an insertion element, wherein the clip exhibits a channel, an inner contour of the channel is adapted to be altered as a function of the distance between two barbs, and wherein the barbs have a released state and a compressed state, and the insertion element is adapted to be introduced into the channel when the barbs are in the released state.

9. The system according to claim 8, wherein the barbs are joined with connecting elements of the clip, or the barbs are molded onto the connecting elements of the clip, and one or more sections on a connecting element comprise an inner contour section of the channel.

10. The system according to claim 8, wherein the channel incorporates threaded sections, which are adapted to be made to engage the insertion element, which exhibits a thread.

11. The system according to claim 8, wherein the insertion element is a plug element.

12. The system according to claim 11, wherein the insertion element comprises multiple parts.

13. The system according to claim 8, wherein the insertion element exhibits a predetermined breaking point.

14. The system according to claim 8, wherein a mount for holding the insertion element is formed on the clip.

15. The system according to claim 8, characterized in that wherein the insertion element is at least partially enveloped by the spacer.

16. The system according to claim 8, wherein the second connector exhibits an access opening on the insertion element, and wherein the access opening is adapted to be situated essentially centrally over the channel.

17. The system according to claim 8, wherein the insertion element is made out of a plastic or metal.

18. The fastener according to claim 1, wherein the second connector has a clip suitable for joining with the panel.

19. The fastener according to claim 1, wherein the first end of the spacer is rigidly joined with the first connector, and the second end of the spacer is detachably fastened with the second connector, or the first end of the spacer is rigidly joined with the second connector, and the second end of the spacer is detachably fastened with the second connector.

20. The fastener according to claim 19, wherein the first end of the spacer is rigidly joined with the first connector, and a head protrudes from the second end of the spacer and is detachably accommodated between two clamps, which are provided on the second connector, or the first end of the spacer is rigidly joined with the second connector, and a head protrudes from the second end of the spacer and is detachably accommodated between two clamps, which are provided on the first connector.

21. The fastener according to claim 20, wherein the first end of the spacer is rigidly joined with the first connector, and a head protrudes from the second end of the spacer and is detachably accommodated between two clamps, which are provided on the second connector, wherein the second connector exhibits a flat surface that has a hole and faces the first connector, and the two clamps engage through the hole in the direction toward the first connector, wherein the head is held by the two clamps above the hole and on the side of the surface on which the first connector is also situated, or the first end of the spacer is rigidly joined with the second connector, and a head protrudes from the second end of the spacer and is detachably accommodated between two clamps, which are provided on the first connector, wherein the first connector exhibits a flat surface that has a hole and faces the second connector, and the two clamps engage through the hole in the direction toward the second connector, wherein the head is held by the two clamps above the hole and on the side of the surface on which the second connector is also situated.

22. A cover panel for an airbag, comprising a fastener according to claim 1, wherein the second connector is joined with the cover panel.

23. A vehicle with a structure and an airbag and a cover panel for the airbag according to claim 22, wherein the airbag is arranged between the cover panel and structure, and that the first connector is joined with the structure.

* * * * *